(12) United States Patent
Carnevali

(10) Patent No.: US 7,891,618 B2
(45) Date of Patent: Feb. 22, 2011

(54) CONVERTIBLE C-CLAMP

(76) Inventor: Jeffrey D. Carnevali, 5957 Beach Dr. SW., Seattle, WA (US) 98136

( * ) Notice: Subject to any disclaimer, the term of this patent is extended or adjusted under 35 U.S.C. 154(b) by 232 days.

(21) Appl. No.: 12/070,664

(22) Filed: Feb. 20, 2008

(65) Prior Publication Data

US 2008/0296454 A1 Dec. 4, 2008

Related U.S. Application Data

(63) Continuation-in-part of application No. 11/809,281, filed on May 31, 2007.

(51) Int. Cl.
*A47B 96/06* (2006.01)
*E04G 3/00* (2006.01)
*F16B 1/00* (2006.01)
*G09F 7/18* (2006.01)

(52) U.S. Cl. .............. 248/228.6; 248/229.15; 248/229.25; 248/231.61; 248/230.6; 248/229.14; 248/229.24; 248/228.5; 248/230.5; 269/143; 269/249; 269/276

(58) Field of Classification Search ............ 248/229.15, 248/229.25, 228.6, 230.6, 229.14, 229.24, 248/228.5, 230.5, 231.61; 269/143, 249; 29/276
See application file for complete search history.

(56) References Cited

U.S. PATENT DOCUMENTS

| | | | | |
|---|---|---|---|---|
| 273,857 A * | 3/1883 | Kirk | ............................ | 248/207 |
| 688,230 A * | 12/1901 | Isgrig | ....................... | 248/316.1 |
| 746,188 A * | 12/1903 | Sonsthagen | ............ | 248/229.15 |
| 1,045,123 A * | 11/1912 | Clisby | ..................... | 248/117.7 |
| 1,369,747 A * | 2/1921 | Jordan | ......................... | 297/273 |
| 1,459,093 A * | 6/1923 | French | ........................ | 269/156 |
| 1,498,638 A * | 6/1924 | Periolat | ........................ | 269/47 |
| 1,973,238 A * | 9/1934 | Walter | ......................... | 269/101 |
| 2,236,913 A * | 4/1941 | Merrill | ........................ | 138/99 |
| 2,440,137 A * | 4/1948 | Beattie | ..................... | 248/228.6 |
| 2,711,300 A * | 6/1955 | Nelson | ........................ | 248/214 |
| 2,893,673 A * | 7/1959 | Maly | ........................... | 248/126 |
| 2,896,896 A * | 7/1959 | Revzin | .................. | 248/229.15 |
| 2,988,310 A * | 6/1961 | Wright | ........................ | 248/511 |
| 3,052,462 A * | 9/1962 | Butler | ......................... | 269/249 |
| 3,096,961 A * | 7/1963 | Powell | .................. | 248/229.15 |
| 3,448,957 A * | 6/1969 | Friedman | ............... | 248/231.71 |
| 3,897,922 A * | 8/1975 | Keen | ........................... | 248/514 |
| 3,934,804 A * | 1/1976 | Bruce | ..................... | 248/229.15 |
| 4,134,578 A * | 1/1979 | Stanley | ........................ | 269/249 |
| 4,363,475 A * | 12/1982 | McCarty | ....................... | 269/69 |
| 4,874,155 A * | 10/1989 | Goul | ............................... | 269/6 |
| 5,135,209 A * | 8/1992 | Penny | ......................... | 269/249 |
| 5,161,787 A * | 11/1992 | Hobday | .......................... | 269/6 |
| 5,312,097 A * | 5/1994 | Womack | ...................... | 269/139 |

(Continued)

*Primary Examiner*—Anita M King
*Assistant Examiner*—Nkeisha J Smith
(74) *Attorney, Agent, or Firm*—Charles J. Rupnick, Attorney at Law

(57) ABSTRACT

A convertible clamp device including a C-shaped frame having first and second substantially opposing interconnected arms; a clamping rod carried by the first arm for longitudinal movement in a first clamping direction toward an internal face of the second arm and in a second opposite direction away from the second arm; different first and second movable clamping jaws removably coupleable to a portion of the clamping rod between the arms of the frame; and different first and second stationary clamping anvils being disposable on the internal face of the second arm.

13 Claims, 19 Drawing Sheets

U.S. PATENT DOCUMENTS

| | | | | |
|---|---|---|---|---|
| 5,326,059 A * | 7/1994 | Pryor et al. | | 248/231.71 |
| 5,454,551 A * | 10/1995 | Hobday | | 269/6 |
| 5,626,320 A * | 5/1997 | Burrell et al. | | 248/230.6 |
| 5,664,750 A * | 9/1997 | Cohen | | 248/231.71 |
| 5,690,604 A * | 11/1997 | Barnett | | 600/38 |
| 5,823,657 A * | 10/1998 | Price et al. | | 362/191 |
| 5,845,885 A * | 12/1998 | Carnevali | | 248/181.1 |
| 6,431,534 B1 * | 8/2002 | Orosz et al. | | 269/43 |
| 6,955,344 B2 * | 10/2005 | Brass et al. | | 269/45 |
| 7,387,296 B2 * | 6/2008 | Alberti | | 269/249 |
| 7,610,664 B2 * | 11/2009 | Wridt et al. | | 29/257 |
| 2005/0257352 A1 * | 11/2005 | Carnevali | | 24/523 |
| 2006/0026807 A1 * | 2/2006 | Carnevali | | 24/523 |
| 2006/0070221 A1 * | 4/2006 | Wridt et al. | | 29/281.1 |
| 2006/0231723 A1 * | 10/2006 | Fayerman | | 248/540 |

* cited by examiner

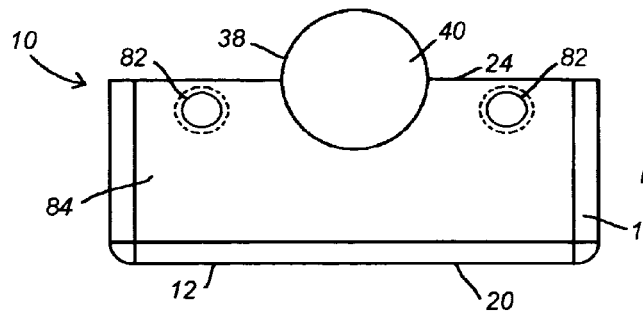
Fig. 6
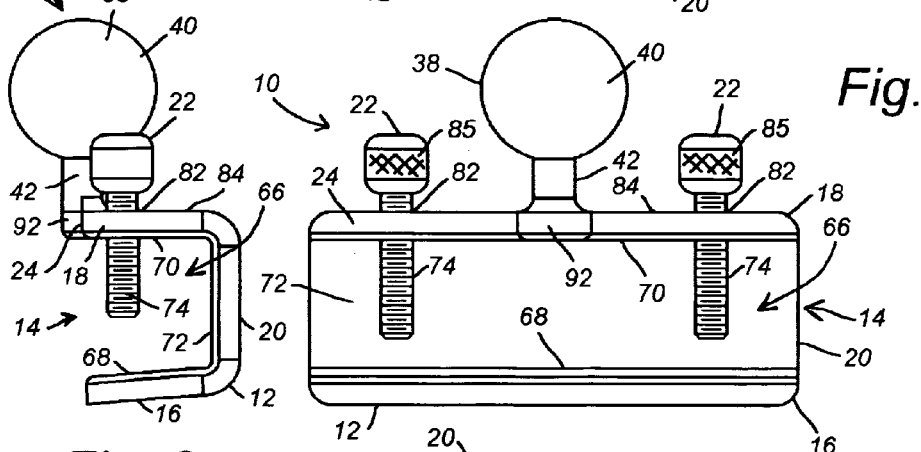
Fig. 7
Fig. 8
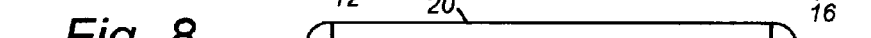
Fig. 9
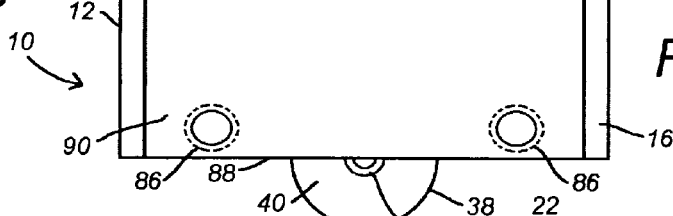
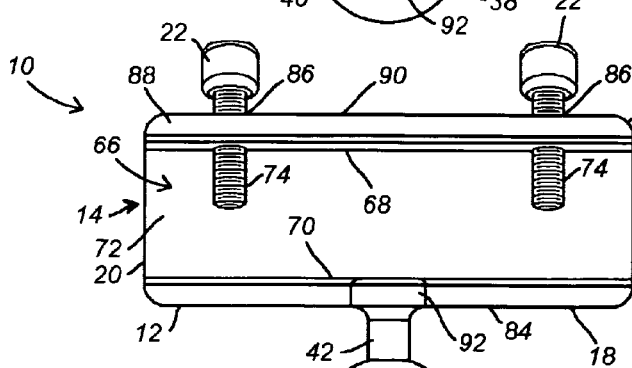
Fig. 10
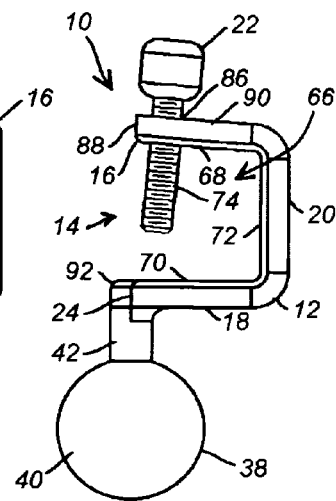
Fig. 11

US 7,891,618 B2

CONVERTIBLE C-CLAMP

This application is a Continuation-in-part and claims priority benefit of copending parent U.S. patent application Ser. No. 11/809,281 filed in the name of Jeffrey D. Carnevali on May 31, 2007, the complete disclosure of which is incorporated herein by reference.

FIELD OF THE INVENTION

The present invention relates generally to clamps for holding portable devices, and in particular to portable C-clamps for use with ball-and-socket connectors in aviation environments having both cylindrical and rectilinear mounting surfaces.

BACKGROUND OF THE INVENTION

Display space on the control panel of an aircraft is limited by the physical dimensions of the cockpit and the number of instruments displayed on the control panel is limited by the physical size of the instrument's display which must be large enough to be easily read by the crew. These control panel space constraints limit the number of instruments available on the control panel of any aircraft, from the small private airplane to the large commercial airliners. For example, current private airplanes are typically equipped with a standard avionics package that includes a pair of radios and a pair of navigation receivers. The control panel is filled with engine instrument displays, airplane control displays and navigation/voice radio displays. No room exists on the control panel for map displays, such as those that use information from a global positioning system (GPS). Although larger and carrying more instruments, commercial airliners suffer similar space constraints. Similar constraints also limit the number of instruments which can be displayed on the control panel of a land or water-based vehicle, i.e., the dash board of an automobile or a boat. In such situations display space is a premium.

Because display space is a premium, instrument panels generally do not provide space for redundancy, i.e., back-up displays for any or all flight critical instruments. Nor is space available for additional flight information. Thus, as current technology provides new information sources, for example, the GPS position information, the instrument display must compete with the existing instruments for space on the control panel. Some of the new technology products provide critical flight safety information which must somehow be provided to the crew. Additionally, pilots must routinely consult pre-flight check lists, flight charts, approach plates, and other flight information documents, while operating the aircraft. For example, during landing pilots generally prefer to have an approach plate or map in plain view for easy reference.

Examples of efforts to provide additional display space include such products as so called "lap boards." Lap boards, as described in U.S. Design Pat. No. 317,788, AVIATION LAP BOARD, are literally boards strapped to the pilot's leg which provide an extra flat surface for holding maps for reference during flight or landing. However, the pilot is forced to continually look down at the lap board to read the documents which interrupts attention to the instruments and windshield. Another example is the clip board mounted to the column of the aircraft control yoke described in each of U.S. Pat. No. 4,969,623, FLIGHT DOCUMENTS ORGANIZER and U.S. Pat. No. 5,441,229, HOLDER FOR ASSEMBLAGE OF PILOT FLIGHT CHARTS. U.S. Pat. No. 3,809,338, TIMER AND APPROACH PLATE HOLDER FOR AIRCRAFT describes such a clip board, incorporating a chronometer, which mounts by a spring clip onto the yoke column. U.S. Pat. No. 5,222,690, VEHICULAR DESK OR INFORMATION DISPLAY, describes another such clip board, incorporating a video display, which again mounts by a clamp onto the yoke column. Other clip boards are know which are designed to mount directly onto the control yoke, either as a removable attachment or as an integral part of the control yoke (no examples found). The described control column and yoke mounted clip boards provide the pilot with an easily viewable display.

Presently, pilots often temporarily mount the approach map, or another aeronautical chart or flight information document, like a recipe card on the clip board. However, while pilots need to comfortably and effectively consult these documents in a timely fashion as the need arises, such maps and documents tend to obscure other critical flight instruments and engine and fuel monitoring instruments on the control panel. Also, these documents tend to become awkward and unwieldy when too large to conveniently fit on the clip board. Some further disadvantages of control column mounted clip boards are that they are costly for many private pilots and that small aircraft manufacturers cannot provide these useful displays because their temporary nature does not allow for certification.

Other examples of efforts to provide additional display space include suction cup clamp devices. Suction cup clamp devices, as described in U.S. Pat. No. 6,666,420, SUCTION CUP HAVING COMPACT AXIAL INSTALLATION AND RELEASE MECHANISM, invented by the inventor of the disclosed invention, which is incorporated herein by reference, are clamps that provide additional display space by mounting to smooth cockpit surfaces, such as the front or side windscreens. Suction cup clamp devices may include means for mounting the resiliently compressible ball-shaped coupler described in U.S. Pat. No. 5,845,885, UNIVERSALLY POSITIONABLE MOUNTING DEVICE, invented by the inventor of the disclosed invention, which is incorporated herein by reference. However, suction cup clamp devices may have limited value in mounting electronics devices as, under certain circumstances, ambient light tends to wash out images on display screens, especially liquid crystal display (LCD) screens.

Thus, to date, whether an air, land or water-based vehicle, cockpit display space remains severely limited.

SUMMARY OF THE INVENTION

The present invention is a novel convertible C-clamp device that overcomes limitations of the prior art for providing additional display volume for cockpit instrumentation, which includes a method of operating the novel convertible C-clamp device for other useful purposes.

According to one aspect of the novel convertible C-clamp device, the novel convertible C-clamp device includes a C-shaped frame having first and second substantially opposing interconnected arms; a clamping rod that is carried by the first arm for longitudinal movement in a first clamping direction toward an internal face of the second arm and in a second opposite direction away from the second arm; different first and second movable clamping jaws that are removably coupleable to a portion of the clamping rod between the arms of the frame; and different first and second stationary clamping anvils that are alternatively disposable on the internal face of the second arm.

According to another aspect of the novel convertible C-clamp device, the novel convertible C-clamp device includes a generally C-shaped frame having first and second substantially opposing arm portions each further including a free end, wherein the free end of the first arm portion further includes a threaded bore, and wherein the free end of the second arm portion further includes a first permanent stationary clamping anvil continuous therewith and having a concavely arched clamping surface facing substantially toward the free end of the first arm portion. A bore is positioned substantially central thereof and substantially aligned with the threaded bore of the free end of the first arm portion.

According to another aspect of the novel convertible C-clamp device, the novel convertible C-clamp device includes a threaded rod having a first outboard end and a second inboard end and is formed with an external thread therebetween that is complementary of the threaded bore of the free end of the first arm portion of the frame, and the second inboard end of the threaded rod further includes a convex swivel head. The threaded rod is receivable within the threaded bore of the frame for movement of the second inboard end between a first retracted position relative to a free end of the second arm, and a second extended position relative thereto.

According to another aspect of the novel convertible C-clamp device, the novel convertible C-clamp device includes a control member coupled to the first outboard end of the threaded rod for controlling movement of the threaded rod between the first retracted position and the second extended position.

According to another aspect of the novel convertible C-clamp device, the novel convertible C-clamp device includes a first planar movable clamping jaw having a substantially planar forward clamping surface and an aperture rearward thereof that communicates with a complementary concave socket formed therein, wherein the aperture is sized to releasably receive the convex swivel head of the threaded rod therethrough into the complementary concave socket, and wherein the complementary concave chamber is formed to freely rotate and swivel about the swivel head.

According to another aspect of the novel convertible C-clamp device, the novel convertible C-clamp device includes a second arched movable clamping jaw that is interchangeable with the first planar movable clamping jaw on the convex swivel head of the threaded rod. The second arched movable clamping jaw includes an arched forward clamping surface and an aperture rearward thereof that communicates with a complementary concave socket formed therein, wherein the aperture is sized to releasably receive the convex swivel head of the threaded rod therethrough into the complementary concave socket, and wherein the complementary concave socket is formed to freely rotate and swivel about the convex swivel head.

According to another aspect of the novel convertible C-clamp device, the novel convertible C-clamp device includes a second removable stationary clamping anvil having a substantially planar clamping surface opposite from a convexly arched base that is complementary to the concavely arched clamping surface of the first permanent stationary clamping anvil. The second removable stationary clamping anvil further includes a clearance bore positioned substantially central of the clamping surface and formed with a seat recessed relative to the clamping surface.

According to another aspect of the novel convertible C-clamp device, the novel convertible C-clamp device includes a removable fastener having a threaded shank portion that is sized to pass through the clearance bore of the second removable stationary clamping anvil, and a head portion that is enlarged relative to the clearance bore.

According to another aspect of the novel convertible C-clamp device, the novel convertible C-clamp device includes a complementary threaded retainer that is substantially aligned with the threaded bore of the free end of the first arm portion of the C-shaped frame, wherein the complementary threaded retainer is threaded to mate with threads formed on the threaded shank portion of the fastener.

According to another aspect of the novel convertible C-clamp device, the novel convertible C-clamp device also includes a part-spherical coupler that is projected from an external portion of the C-shaped frame.

According to another aspect of the novel convertible C-clamp device, the concavely arched clamping surface of the first permanent stationary clamping anvil is further formed with an inside wall surface that is extended substantially transversely of the threaded bore portion of the free end of the first arm portion of the frame; and the complementary convexly arched base of the second removable stationary clamping anvil is further formed with an outside wall surface that is extended substantially transversely of the substantially planar clamping surface opposite therefrom.

According to another aspect of the novel convertible C-clamp device, the arched forward clamping surface of the second arched movable clamping jaw is further formed with an inside wall surface that is extended substantially transversely of the aperture thereof communicating with the complementary concave socket formed therein.

According to another aspect of the novel convertible C-clamp device, the bore in the free end of the second arm portion is further formed as a substantially smooth clearance bore that is extended substantially therethrough the free end of the second arm portion, and a recessed nut pocket is positioned opposite of the concavely arched clamping surface and substantially aligned with the clearance bore; and the complementary threaded retainer is a nut that is threaded to mate with threads formed on the threaded shank portion of the fastener and sized to be at least partially received into the recessed nut pocket.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 6 is a top elevation view of the novel clamp device having a pair of thumb screws removed for clarity, and showing a pair of threaded holes formed in a portion thereof on opposites sides of a ball-end coupler having a resiliently deformable part-spherical head;

FIG. 7 is a back elevation view of the novel clamp device including the pair of thumb screws;

FIG. 8 is a side elevation view of the novel clamp device including the pair of thumb screws;

FIG. 9 is a bottom elevation view of the novel clamp device including a pair of threaded holes formed in a portion thereof opposite from the ball-end coupler, this pair of threaded holes being either in combination with, or in substitution for, the threaded holes formed on either side of the ball-end coupler;

FIG. 10 is a back elevation view of the novel clamp device including a pair of thumb screws threaded into the pair of threaded holes formed opposite from the ball-end coupler;

FIG. 11 is an opposite side elevation view of the novel clamp device including a pair of thumb screws threaded into the pair of threaded holes formed opposite from the ball-end coupler;

DETAILED DESCRIPTION OF PREFERRED EMBODIMENT

In the Figures, like numerals indicate like elements.

Figure 1:
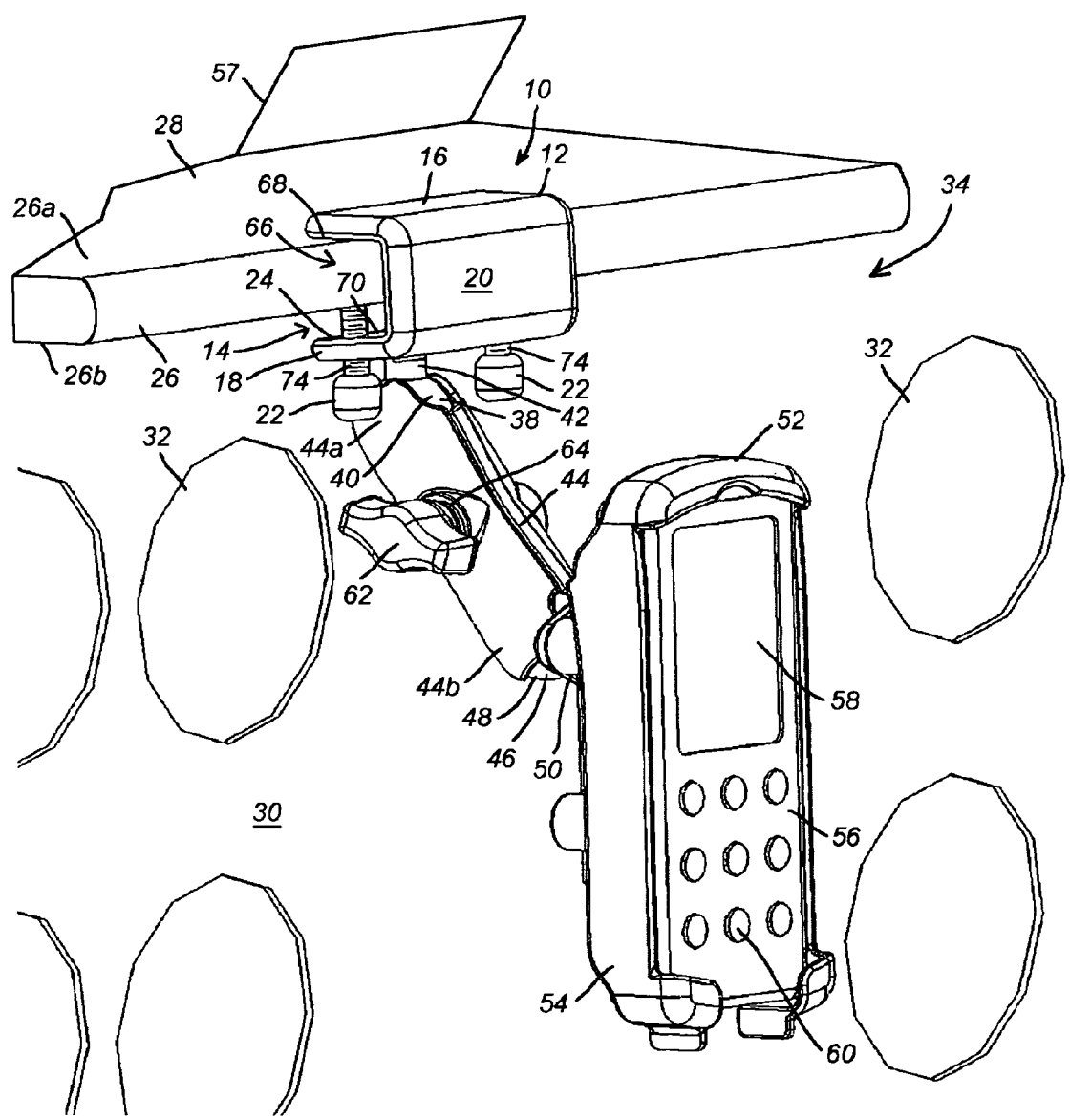
FIG. 1 is a perspective view illustrating a novel clamp device and showing an example of a method of operating the novel clamp device disclosed herein.

FIG. 1 is a perspective view showing an example of a method of operating a novel clamp device 10 of the type disclosed herein. The clamp device 10 is formed of a substantially rigid elongated jaw portion 12 forming an elongated and substantially uniform mouth opening 14 thereinto between opposing upper and lower plates 16 and 18 spaced apart by an opposing backing plate portion 20. The upper and lower plates 16, 18 and backing plate 20 are illustrated here by example and without limitation as substantially identical uniformly long, flat and relatively thin rigid plates. The backing plate 20 is optionally a thicker plate than the upper and lower plates 16, 18 and may be curved, without deviating from the scope and intent of the present invention. A pair of thumb screws 22 is spaced apart along the elongated jaw portion 12. The thumb screws 22 are threaded into the mouth opening 14 adjacent to an outer lip portion 24 of the lower plate 18. The lower plate 18 having the thumb screws 22 thus operates as a drive plate, while the opposing upper plate 16 operates as an anvil. The jaw portion 12 of the clamp device 10 is, for example, fit over any jutting structure of the vehicle which the mouth opening 14 is sized to receive thereinto. By example and without limitation, the mouth opening 14 is fit over an edge protrusion 26 of a cockpit dashboard 28 jutting beyond and overhanging an instrument panel 30, as is common in boats, planes and automobiles to shade instruments 32 from dome lights inside the vehicle cockpit. The dashboard 28 is typically at or below window level so that the edge protrusion 26 also shades the instrument panel 30 from ambient sunlight. The instrument panel 30 and instruments 32 mounted thereon are thus in an area (generally indicated at 34) of the cockpit normally substantially cast into shadow by the overhanging edge protrusion 26 of the dashboard 28.

A ball-end mount or "coupler" 38 with a resiliently deformable part-spherical head 40 and formed thereon is extended from the lower plate 18 on a reduced diameter columnar stem or "neck" 42 relatively upstanding thereon adjacent to the outer lip portion 24 between the thumb screws 22. Positioning the ball-end coupler 38 on the same lower plate 18 with the thumb screws 22 is not a necessary requirement of the clamp device 10; however, such relative positioning ensures the thumb screws 22 will be available for tightening when the ball-end coupler 38 is positioned in a useful place relative to the dashboard 28 or other available vehicle cockpit structure. For example, the upper plate 16 is optional slipped into a narrow slot between a rigid pocket panel and a door panel that may be wide enough to admit the slim upper plate 16, but too narrow to admit the longer thumb screws 22 or the users' digits for tightening them. Thus, colocating the ball-end coupler 38 in common with the thumb screws 22 on the same lower plate 18 is only the most versatile configuration of the clamp device 10. Furthermore, positioning the ball-end coupler 38 adjacent to the outer lip portion 24 of the lower plate 18 is not a necessary requirement of the clamp device 10; however, such relative positioning ensures the ball-end coupler 38 is removed as far as possible into the shadowed area 34 cast by the edge protrusion 26 of the cockpit dashboard 28.

The ball-end coupler 38 is, by example and without limitation, the coupler having the resiliently deformable part-spherical head as described in U.S. Pat. No. 5,845,885, which is incorporated herein by reference. Any of the hand held portable instruments or documents, such as flight information documents, useful to a boat, plane or automobile pilot may be usefully suspended from the clamp device 10. By example and without limitation, a substantially rigid split-arm socket assembly 44 of the type disclosed by example and without limitation in U.S. Pat. No. 5,845,885, which is incorporated herein above by reference, is rotatably coupled at a first socket end 44a to the part-spherical head 40 of the coupler 38 portion of the clamp device 10. A second socket end 44b of the split-arm socket assembly 44 is coupled to a second resiliently deformable part-spherical head 46 of a second ball-end mount or coupler 48 which is extended from a second reduced diameter stem or "neck" 50 relatively upstanding on a useful cockpit accessory 52, illustrated here by example and without limitation as an instrument tray 54 holding a portable electronic instrument 56, such as a GPS.

The novel clamp device 10 is, by example and without limitation, clamped to the edge protrusion 26 of the cockpit dashboard 28 with the ball-end coupler 38 projected into the shadowed area 34 cast by the edge protrusion 26. Furthermore, the first and second socket ends 44a, 44b of the split-arm socket assembly 44 cooperate with the first and second ball-end couplers 38, 48, respectively, to position the instrument tray 54 below level of a windscreen 57. Cooperation of the ball-end coupler 38 of the clamp device 10 with the split-arm socket assembly 44 and second ball-end coupler 48 furthermore permits positioning of the instrument tray 54 such that view of the instruments 32 is not obscured. With the instrument tray 54 so positioned relative to the dashboard edge protrusion 26, the position and orientation of the instrument 56 are adjusted until a lightable display screen 58 and keypad 60 (if present) of the instrument 56 are appropriately positioned in the shadowed area 34 cast by the cockpit dashboard 28 yet out of line-of-sight of instruments 32 on the instrument panel 30, and the display screen 58 and keypad 60 (if present) are appropriately oriented for viewing. The display screen 58 and keypad 60 (if present) are thus cast into shadow that ambient light does not wash out images displayed thereon. The instrument 56 is thus readable at a glance, even when the display screen 58 is of the LCD variety, but does not interfere with viewing the permanent cockpit instruments 32.

When the instrument 56 is appropriately positioned with the display screen 58 and keypad 60 (if present) in the shadowed area 34 cast by the cockpit dashboard 28, a knob 62 portion of a clamping mechanism 64 is tightened relative to the split-arm assembly 44, which effectively interlocks its first and second socket ends 44a, 44b with the first and second ball-end couplers 38, 48, respectively, to retain the selected positioning.

Figure 2:
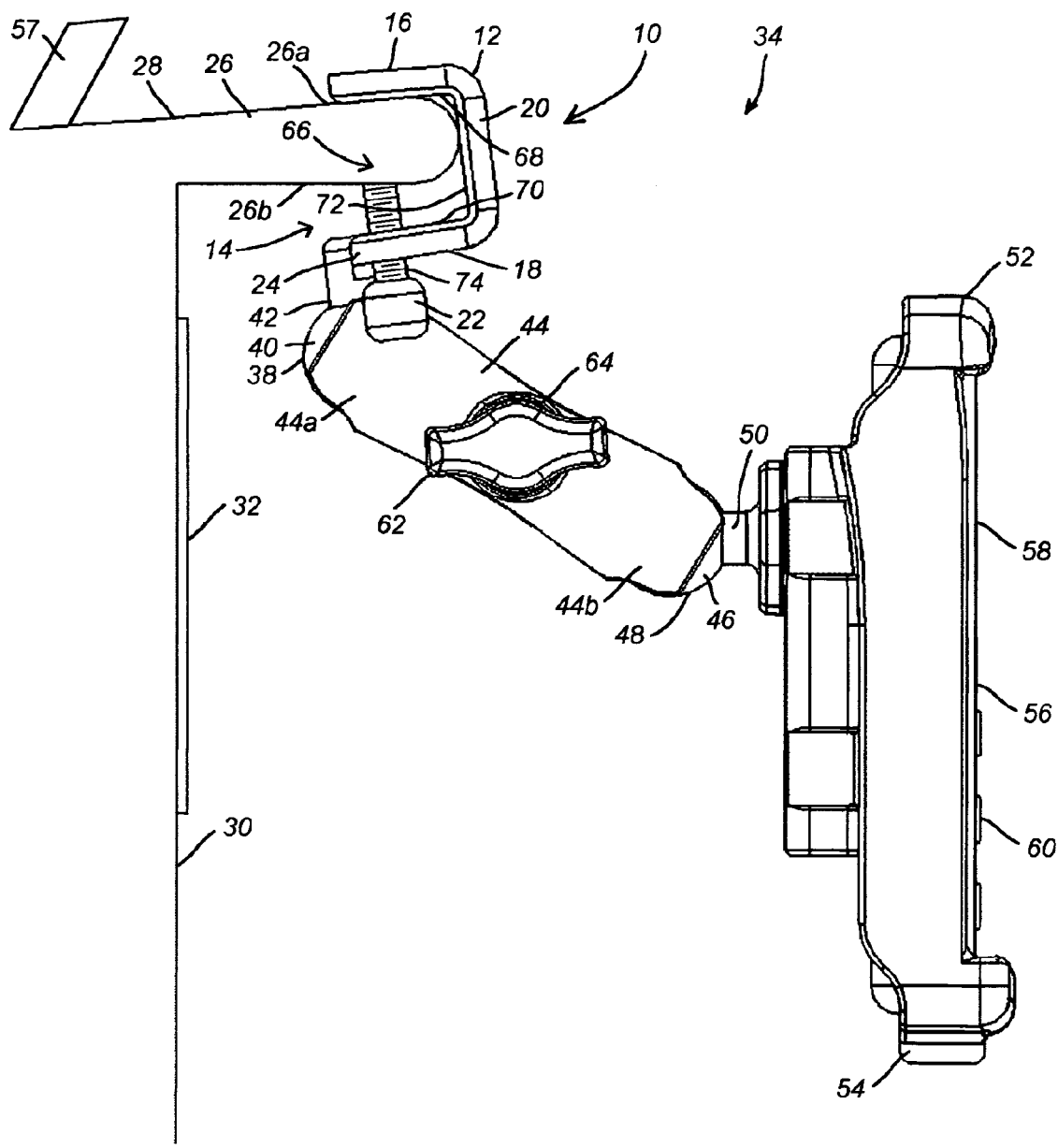
FIG. 2 is a side view more clearly showing the novel clamp device and the example of a method of operating the device, as illustrated in FIG. 1.

FIG. 2 is a side view more clearly showing the clamp device 10 clamped to the edge protrusion 26 of the cockpit dashboard 28 with the ball-end coupler 38 projected into the shadowed area 34 of the cockpit. As illustrated here, while not a necessary requirement of the clamp device 10, relative positioning the ball-end coupler 38 adjacent to the outer lip portion 24 of the lower plate 18 ensures the ball-end coupler 38 is removed as far as possible into the shadowed area 34 cast by the edge protrusion 26 of the cockpit dashboard 28. Furthermore, colocating the ball-end coupler 38 in common with the thumb screws 22 on the same lower plate 18 is illustrated here as being unnecessary to operation of the clamp device 10. However, such common positioning of the ball-end coupler 38 with the thumb screws 22 remains the most versatile configuration of the clamp device 10.

Here, the clamp device 10 is shown more clearly having the mouth opening 14 of the jaw portion 12 wrapped around the cockpit dashboard 28 so the edge protrusion 26 is extended deep into a substantially rectangular throat portion 66 formed between respective substantially planar inner surfaces 68 and 70 of the upper and lower jaw plates 16 and 18. The dashboard edge protrusion 26 is shown here butted against a substantially planar inner surface 72 of the backing plate portion 20. The upper plate 16 of the clamp device 10 is shown more clearly having the inner jaw surface 68 secured against an upper surface 26a of the cockpit dashboard edge protrusion 26. Threaded shafts 74 of the thumb screws 22 inserted through the lower plate 18 are driven against an under surface 26b of the cockpit dashboard edge protrusion 26 to secure the inner jaw surface 68 of the upper plate 16 against the upper cockpit dashboard edge protrusion surface 26a for holding the clamp device 10 in the selected position relative to the cockpit dashboard 28.

Figure 3:
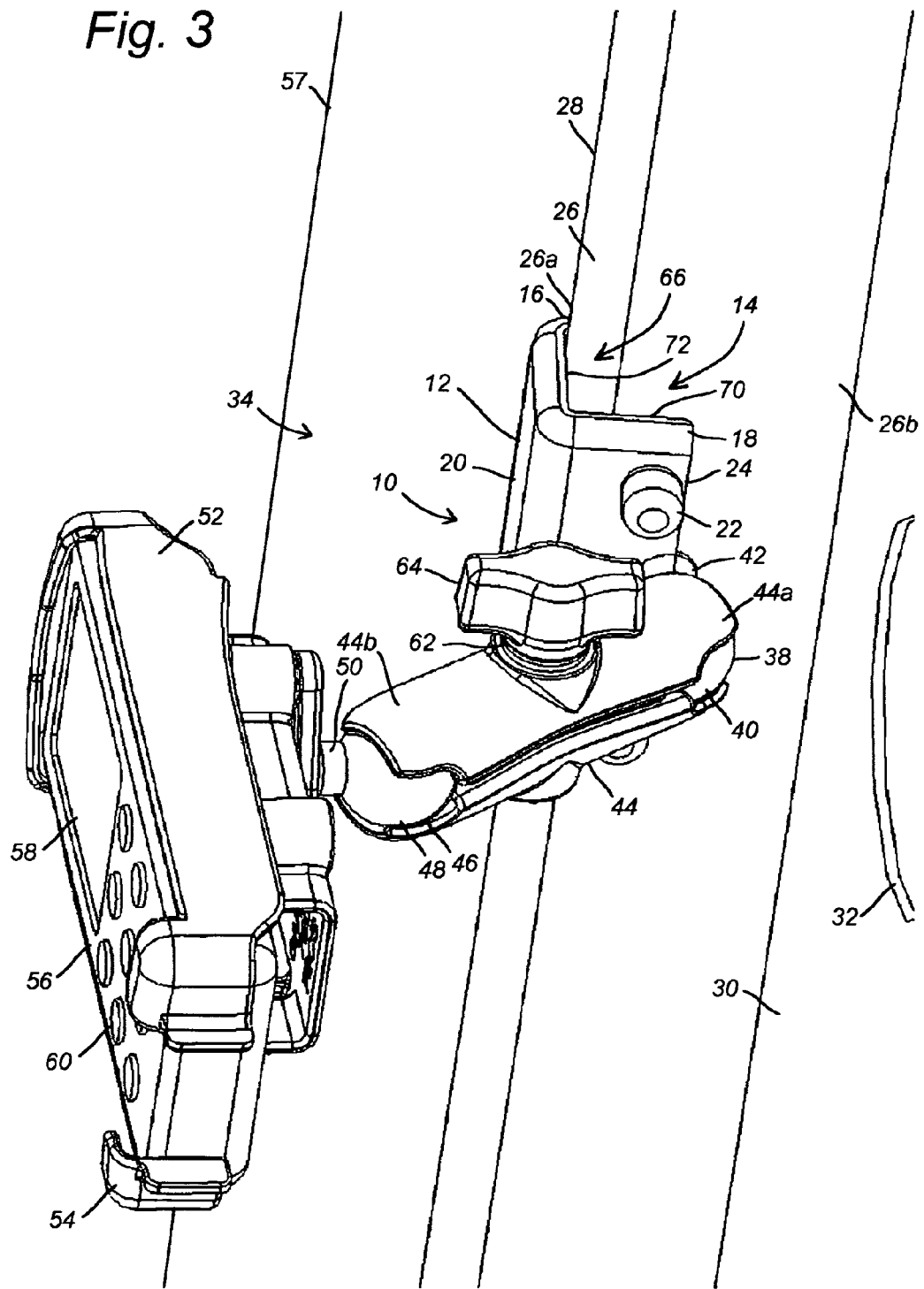
FIG. 3 is a bottom perspective view looking up at the novel clamp device and the example of a method of operating the device, as illustrated in FIG. 1.

FIG. 3 is a bottom perspective view looking up at the clamp device 10 from the shadowed area 34 under the overhanging edge protrusion 26 of the cockpit dashboard 28. Here, the lower plate 18 is more clearly shown having the ball-end coupler 38 projected therefrom between the two spaced apart thumb screws 22.

Figure 4:
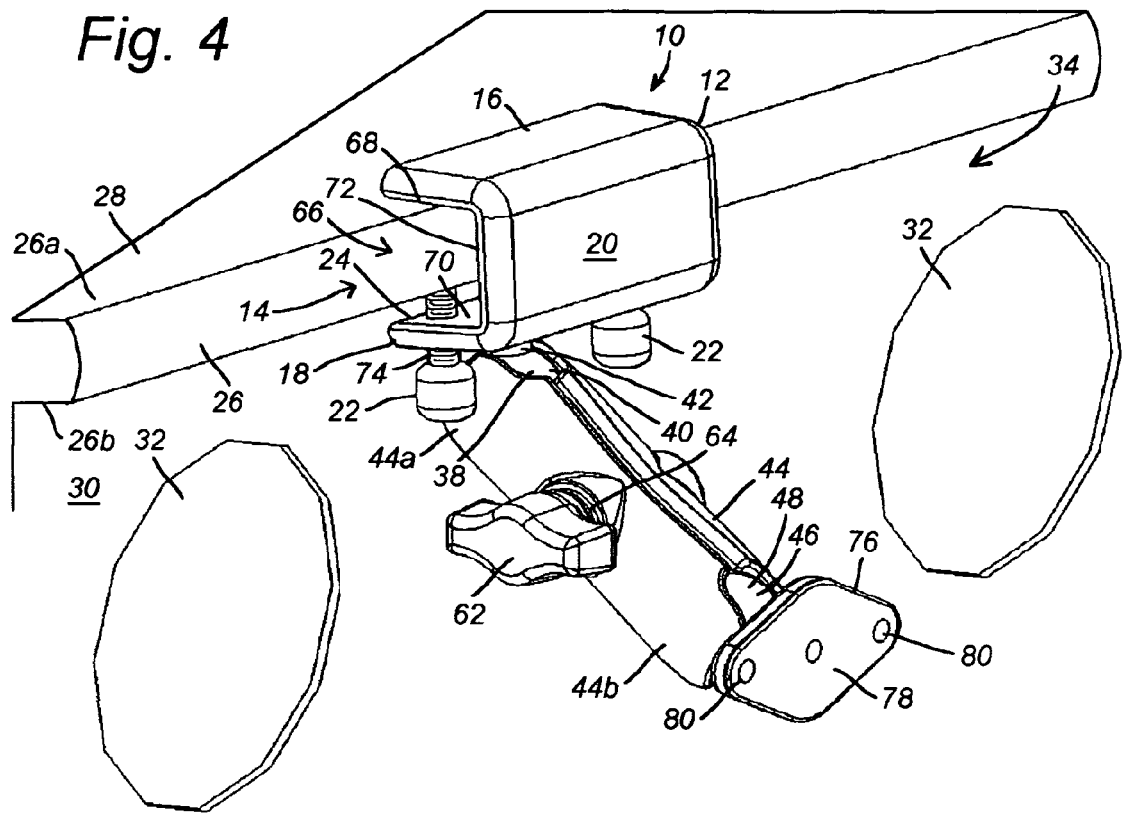
FIG. 4 is a perspective view illustrating the novel clamp device mounted on the edge protrusion of a cockpit dashboard with a ball-end coupler thereof oriented downward into an area shadowed by the dashboard.

FIG. 4 is a perspective view showing the clamp device 10 mounted on the edge protrusion 26 of the cockpit dashboard 28 with the ball-end coupler 38 oriented downward into the shadowed area 34. The clamp device 10 is illustrated here in combination with the cooperating split-arm socket assembly 44 and second ball-end coupler 48, as described herein. Here, the second ball-end coupler 48 is projected from a generic mounting plate 76 structured with a substantially planar mounting surface 78 having spaced apart mounting holes 80 therethrough. Such mounting plates 76 may be used to mount the instrument tray 54, as illustrated herein by example and without limitation.

Figure 5:
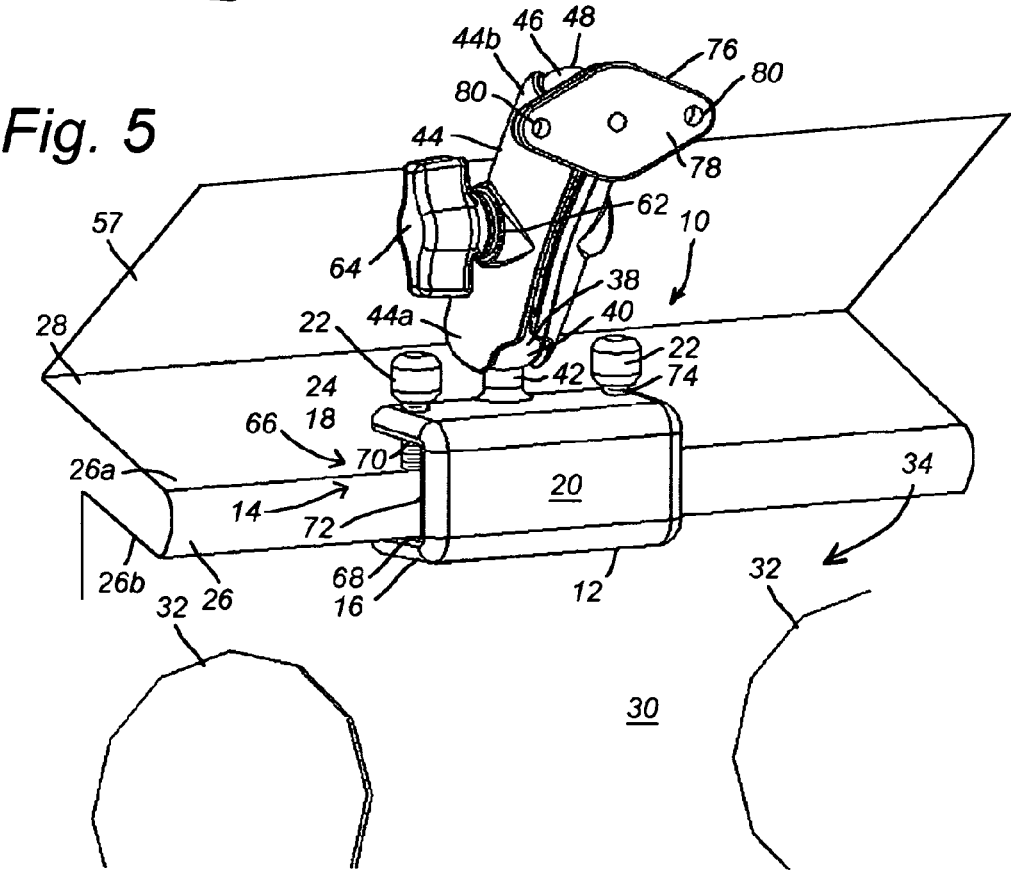
FIG. 5 is a perspective view illustrating the novel clamp device mounted on the edge protrusion of a cockpit dashboard with a ball-end coupler thereof oriented upward into an area above the dashboard.

FIG. 5 is a perspective view showing the clamp device 10 mounted on the dashboard edge protrusion 26 with the ball-end coupler 38 oriented upward above the cockpit dashboard 28. This orientation may be appropriate, for example, for holding paper documents in a lighted portion of the cockpit outside the shadowed area 34 for easier reading.

FIG. 6 is a top elevation view of the clamp device 10 wherein the thumb screws 22 are removed to more clearly show a pair of threaded holes 82 spaced apart along the outer lip portion 24 of the lower jaw plate 18 of the elongated jaw portion 12. The threaded holes 82 extend through the lower jaw plate 18 between a substantially planar outer surface 84 and the inner surface 70. The thumb screws 22 are threaded into the mouth opening 14 through the threaded holes 82 of the lower jaw plate 18. However, as discussed herein above, the thumb screws are optionally provided through the upper jaw plates 16 wherefore the threaded holes 82 are rather formed through the upper jaw plate 16, without deviating from the scope and intent of the present invention.

FIG. 7 is a back elevation view of the clamp device 10 wherein the thumb screws 22 are spaced apart on opposite sides of the ball-end coupler 38. As illustrated here, the threaded shafts 74 of the thumb screws 22 are optionally sized shorter than the mouth opening 14 when threaded through the lower jaw plate 18. The intended use of the novel clamp device 10 is for being fitted over the edge protrusion 26. The edge protrusion 26 has a finite minimum thickness. Therefore, the thumb screws 22 do not need to span the entire width between the upper and lower jaw plates 16, 18. Rather, the thumb screws 22 need only reach far enough to engage the edge protrusion 26 for securing the clamp device 10 thereto. Accordingly, thumb screws 22 with threaded shafts 74 shorter than the full span of the throat 66 project less above the jaw plate 18 external of the jaw portion 12 than would longer thumb screws 22. Thus, although threaded shafts 74 of the thumb screws 22 shorter than the full span of the throat 66 are not a necessary requirement of the clamp device 10, such feature ensures the most streamlined structure relative to the jaw portion 12.

Furthermore, in contrast to the square power threads and T-handle typical of C-clamps and vices, the thumb screws 22 are conventional thumb screws having the shafts 74 threaded with ordinary unified standard screw threads. Heads 85 of the thumb screws 22 are optionally formed with knurling or another anti-slip configuration typical of conventional thumb screws.

FIG. 8 is a side elevation view of the clamp device 10. Here, the jaw portion 12 is illustrated as having the upper jaw plate 16 being nonparallel or angularly canted relative to the lower jaw plate 18 which is substantially square with the backing plate 20. Alternatively, only the substantially planar inner surface 68 of the upper jaw plate 16 is angularly canted relative to the inner surface 70 of the lower jaw plate 18. Accordingly, the mouth opening 14 is wider than the inner surface 72 of the backing plate portion 20. The throat portion 66 thus forms a shallow right triangle truncated at its narrow end by the backing plate 20. Optionally, both the upper and lower jaw plates 16, 18 are canted relative to the backing plate 20 such that they form an isosceles triangle truncated at its narrow end by the backing plate 20.

Furthermore, the thumb screws 22 are position adjacent to the outer lip portion 24 of the lower plate 18, which permits the clamp device 10 to engage and grip even narrow ledges that may not be deep enough to reach the backing plate 20.

FIG. 9 is a bottom elevation view of the clamp device 10 showing the resiliently deformable part-spherical head 40 of the ball-end coupler 38 over the upper jaw plate 16. Here, the upper jaw plate 16 of the elongated jaw portion 12 optionally includes another pair of threaded holes 86 spaced apart along an outer lip portion 88 of the upper jaw plate 16. The threaded holes 86 extend through the upper jaw plate 16 between a substantially planar outer surface 90 and the inner surface 68. Optionally, the thumb screws 22 are threaded into the mouth opening 14 through the optional threaded holes 86 of the upper jaw plate 16, whereby the upper jaw plate 16 operates as the drive plate, while the lower jaw plate 18 operates as the anvil. The pair of threaded holes 86 through the upper jaw plate 16 of the elongated jaw portion 12 are optionally provided either in combination with the threaded holes 82 through the lower jaw plate 18, or in lieu of the threaded holes 82. Thus, elongated jaw portion 12 optionally has either one or both pair of the threaded holes 82 and 86 through the respective lower and upper jaw plates 18 and 16, without departing from the spirit and scope of the invention.

Additionally, as illustrated here by example and without limitation, the lower plate 18 further includes a small ledge protrusion 92 projected from the outer lip portion 24 substantially coplanar therewith and approximately centered relative to both the mouth opening 14 and the threaded holes 86. The reduced diameter stem 42 is formed with approximately one-half its diameter on the outer lip portion 24 of the lower plate 18, and one-half on the small protrusion 92. Positioning the stem 42 partially on the protrusion 92 causes the ball-end coupler 38 to be partially extended beyond the outer lip portion 24 of the lower plate 18, which effectively increases displacement of the ball-end coupler 38 as far as possible into the shadowed area 34 cast by the edge protrusion 26 of the cockpit dashboard 28. The small protrusion 92 beyond the outer lip portion 24 of the lower plate 18 is not a necessary requirement of the clamp device 10; however, such feature ensures the most extreme relative positioning the ball-end coupler 38 relative to the jaw portion 12.

FIG. 10 is a back elevation view of the clamp device 10 wherein the upper jaw plate 16 is structured having the optional pair of threaded holes 86 therethrough, either in combination with, or in substitution for, the threaded holes 82 through the lower jaw plate 18. Here, the thumb screws 22 are threaded through the optional pair of threaded holes 86. The thumb screws 22 are thus in the upper jaw plate 16 opposite from the ball-end coupler 38.

FIG. 11 is an opposite side elevation view of the clamp device 10 having the thumb screws 22 are threaded through the optional pair of threaded holes 86 in the upper jaw plate 16 opposite from the ball-end coupler 38.

Figure 12:
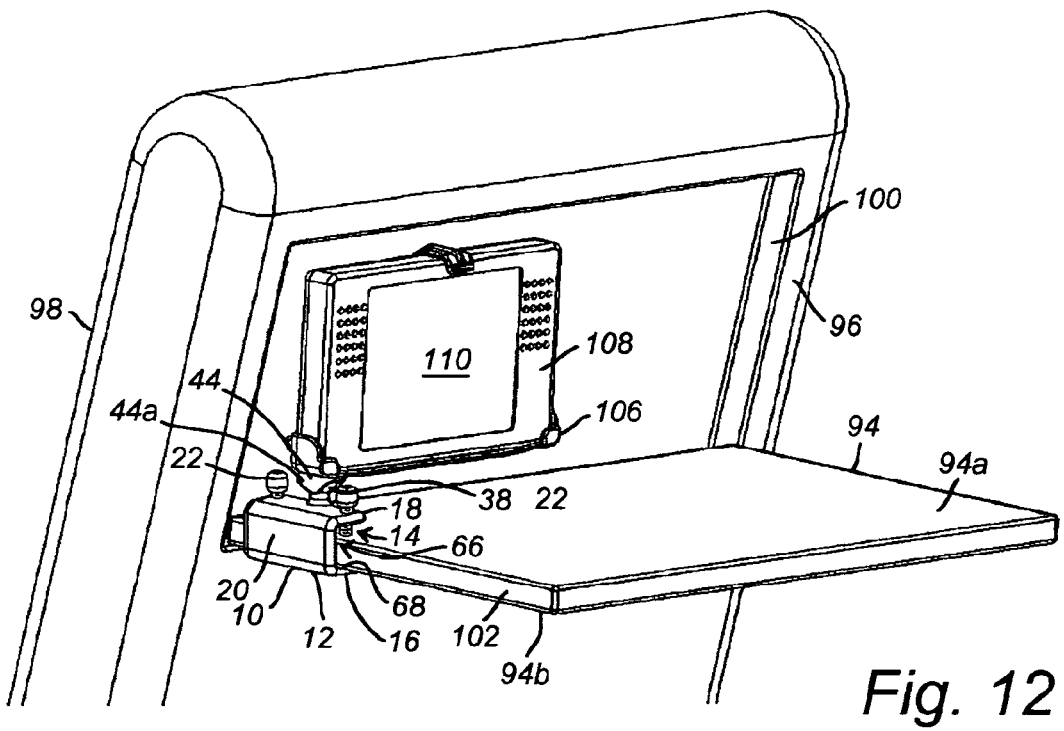
FIG. 12 illustrates another method of operating the novel clamp device as an aviation clamp for use with a fold-out tray table in a deployed configuration relative to a seat back of a forward seat, for example an airplane seat, although the this is optionally the forward seat of a modern automobile or pleasure boat.

FIG. 12 illustrates another method of operating the clamp device 10 as an aviation clamp. Here, the clamp device 10 is secured to a fold-out tray table 94 in a deployed configuration relative to a seat back 96 of a forward seat 98, for example an airplane seat, although the this is optionally the forward seat of a modern automobile or pleasure boat. Such a fold-out tray table 94 is often sized to seat at least partially within a complementary recess 100 formed in the seat back 96. The mouth opening 14 and throat 66 of the jaw portion 12 is fitted over an edge portion 102 of the tray table 94, which is illustrated in this example in a folded-out configuration. The clamp device 10 is oriented here by example and without limitation with the ball-end coupler 38 extended above a working surface 94*a* of the tray table 94. The thumb screws 22 secure the clamp device 10 in position by squeezing the inner surface 68 of the upper jaw plate 16 against a backside 94*b* of the tray table 94. For example, the clamp device 10 is used in combination with the combination with the cooperating split-arm socket assembly 44 and second ball-end coupler 48, as described herein, to hold another instrument tray 106 holding another portable electronic instrument 108, such as a portable computer or DVD player for in-flight viewing of its display screen 110.

Figure 13:
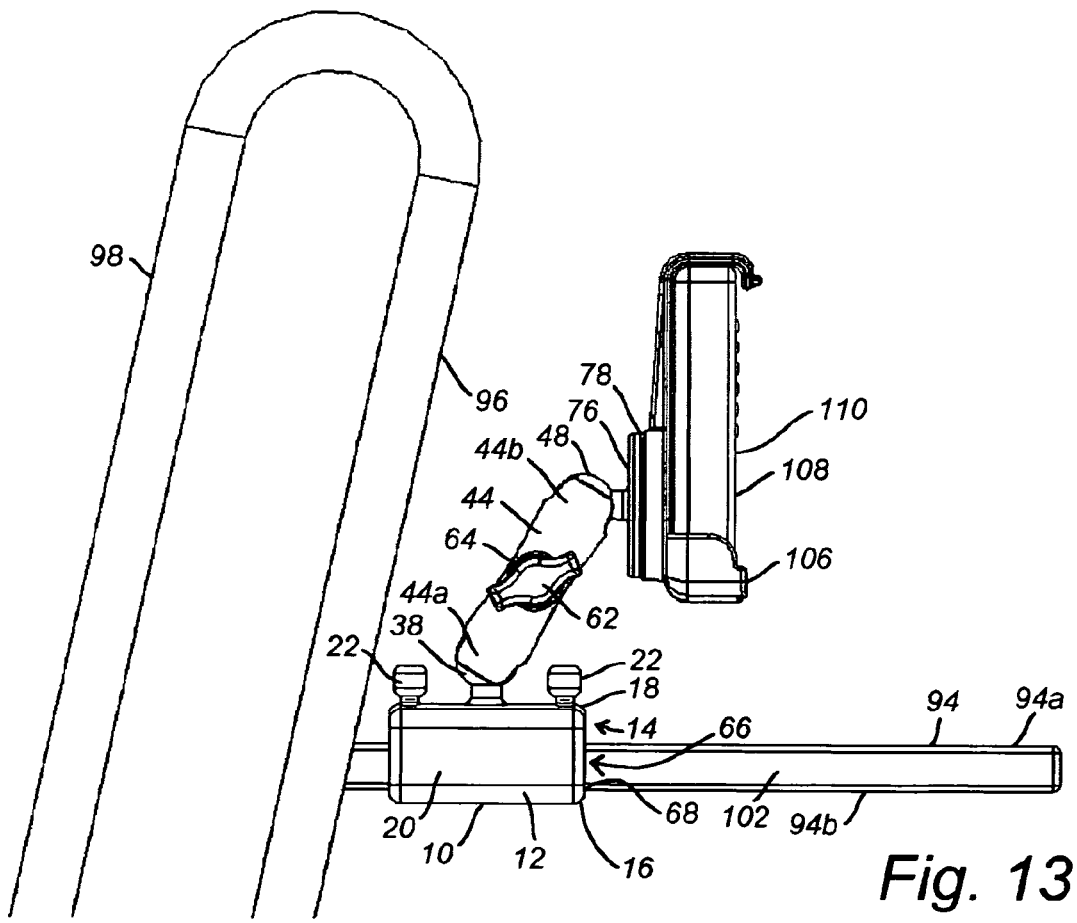
FIG. 13 is a front view of the novel clamp device secured by the thumb screws to an edge portion of the deployed fold-out tray table, as illustrated in FIG. 12.

FIG. 13 is a front view of the clamp device 10 secured by the thumb screws 22 to the edge portion 102 of the deployed fold-out tray table 94, as described herein above. The clamp device 10 is illustrated here by example and without limitation as cooperating with the split-arm socket assembly 44 and second ball-end coupler 48, as described herein, for holding instrument tray 106 for in-flight viewing of the portable electronic instrument 108.

Figure 14:
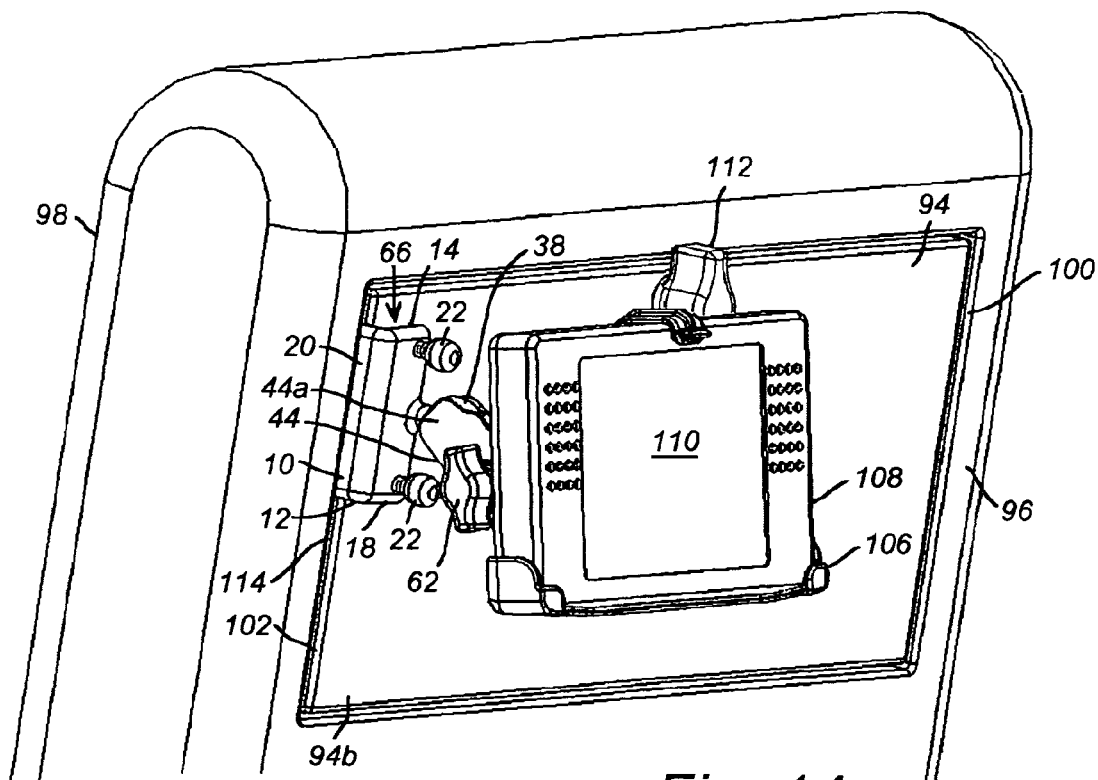
FIG. 14 illustrates another method of operating the novel clamp device as an aviation clamp for use with a fold-out tray table while stored in an upright and locked configuration relative to the seat back of the forward seat.

FIG. 14 illustrates yet another method of operating the clamp device 10 as an aviation clamp. Here, the clamp device 10 is secured to the fold-out tray table 94 stored in an upright and locked configuration relative to the seat back 96 of the forward seat 98, for example an airplane seat, although the this is optionally the forward seat of a modern automobile or pleasure boat. The mouth opening 14 of the jaw portion 12 is fitted over the edge portion 102 of the tray table 94. Here, the clamp device 10 is oriented here by example and without limitation with the ball-end coupler 38 extended above the backside surface 94b of the tray table 94. The thumb screws 22 secure the clamp device 10 in position by squeezing the inner surface 68 of the upper jaw plate 16 against the working surface 94a of the tray table 94. Here, the novel shape of the jaw portion 12 of the clamp device 10 is used to good advantage. As discussed herein, the upper plate 16 is slim to fit into narrow passages. Here, the slim upper plate 16 is thin enough that it does not interfere with closure of the tray table 94 against the seat back 96 of the forward seat 98, and even permits securing a tray table locking knob 112, while in the clamp device 10 remains secured to the tray table edge portion 102.

Furthermore, as discussed herein, the backing plate 20 is slender such that it fits in a narrow gap 114 between the tray table edge portion 102 and the seat back 96 when the tray table 94 is fit into the complementary recess 100. A conventional C-clamp design does not permit closure of the tray table 94 into the confined space of the complementary recess 100. Rather, conventional C-clamp type devices generally have a thin flat anvil plates disposed on a thick stiffener formed by a heavy strong back between the anvil and the threaded drive head holding the threaded drive rod. Typically, the strong back must be thick to adequately support the force generated by the drive rod. Here, the thumb screws 22 are conventional thumb screws, in contrast to the square power threads and T-handle typical of C-clamps and vices. The threaded shafts 74 of the conventional thumb screws 22 have ordinary unified standard screw threads and knurled heads 85 (more clearly shown in earlier Figures). Optionally, the thumb screws 22 are plastic or nylon screws to avoid scratching clamping surfaces. Thus, the forces generated by tightening the thumb screws 22 are minimal as compared with conventional C-clamp devices because the clamp device 10 is expected to support minimal loads.

Thus, the clamp device 10 is used in combination with the combination with the cooperating split-arm socket assembly 44 and second ball-end coupler 48, as described herein, to hold the portable computer, DVD player or other portable electronic instrument 108 in the instrument tray 106 with its display screen 110 positioned for in-flight viewing, even when the tray table 94 is stored in its upright and locked position relative to the seat back 96.

Figure 15:
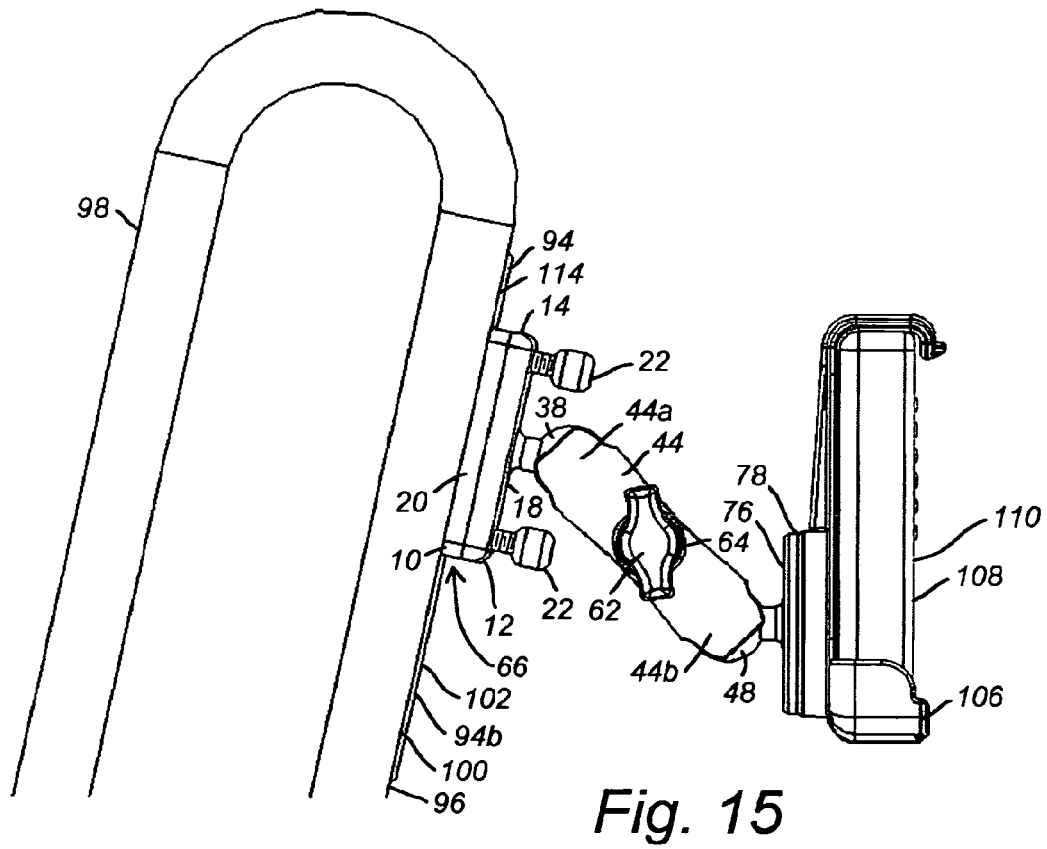
FIG. 15 is a front view of the novel clamp device secured by the thumb screws to an edge portion of the deployed fold-out tray table while stored in its upright and locked position relative to the seat back, as illustrated in FIG. 14.

FIG. 15 is a front view of the clamp device 10 secured by the thumb screws 22 to the edge portion 102 of the tray table 94 while stored in its upright and locked position relative to the seat back 96, as described herein above. The clamp device 10 is illustrated here by example and without limitation as cooperating with the split-arm socket assembly 44 and second ball-end coupler 48, as described herein, for holding instrument tray 106 for in-flight viewing of the portable computer, DVD player or other portable electronic instrument 108.

C-Clamp Device

Figure 16:
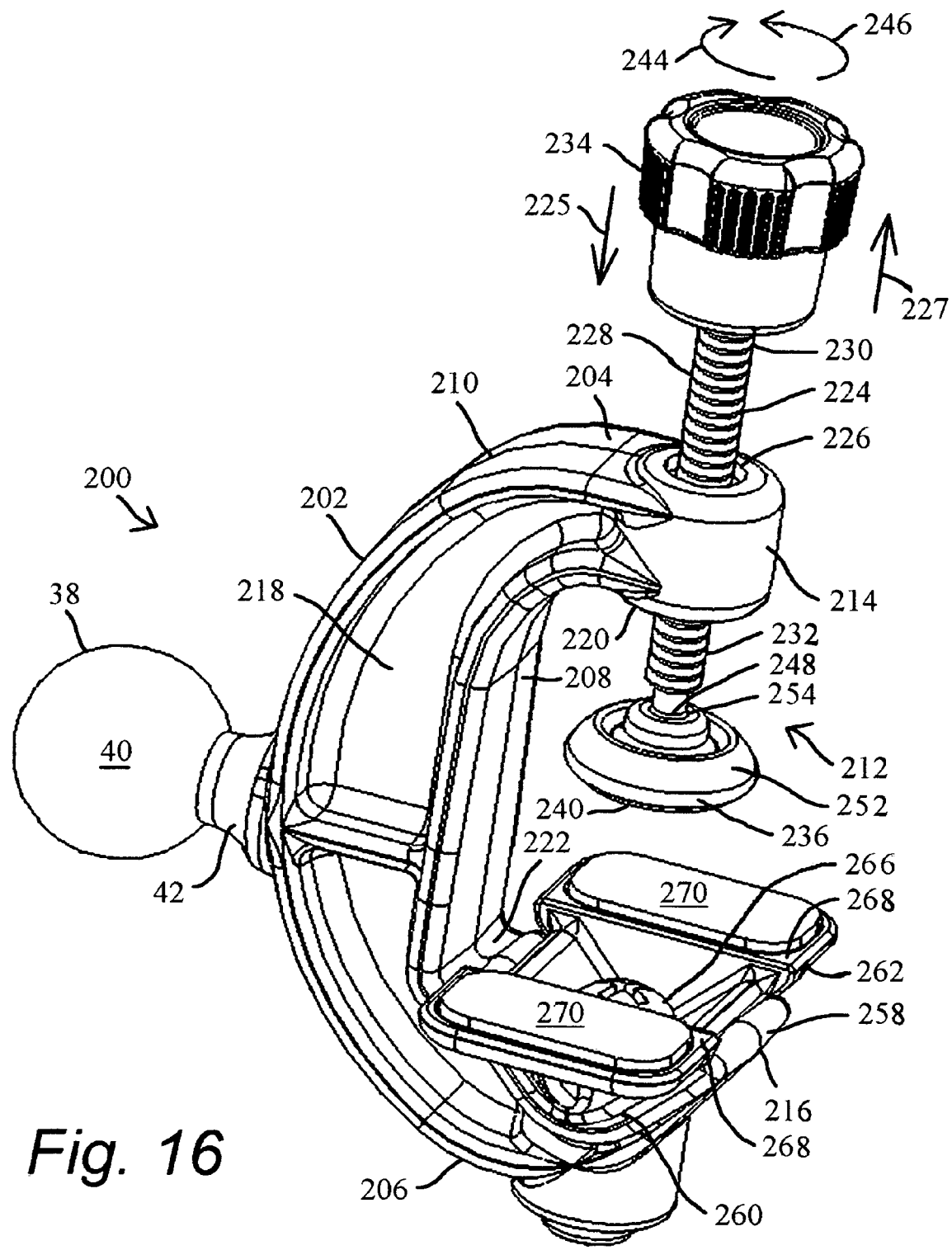
FIG. 16 illustrates a novel alternative convertible C-clamp device having a substantially C-shaped frame with first and second substantially opposing arms, a clamping rod carried by the first arm for longitudinal movement in a first clamping direction toward an internal face of the second arm and in a second opposite direction away from the second arm, different first and second movable clamping jaws removably coupleable to a portion of the clamping rod between the arms of the frame, and different first and second stationary clamping anvils being disposable on the internal face of the second arm.

FIG. 16 illustrates an alternative convertible C-clamp device 200 of the present invention having a substantially C-shaped frame 202 having first and second substantially opposing interconnected arms 204 and 206 with an internal surface or inside 208 encompassed between the arms and an opposite external surface or outside 210. The first and second opposing arms 204, 206 form a throat 212 between their respective free ends 214 and 216. The first and second opposing arms 204, 206 may either be integral with one another or they may be joined by an intermediate shank portion 218. These opposing first and second arms 204, 206 are optionally substantially parallel each to the other. The respective free ends 214 and 216 of the first and second arms 204, 206 are formed with respective opposing internal surfaces 220 and 222 each facing substantially inwardly of the throat 212. The internal surface 222 of the second arm 206 is substantially facing the opposing internal surface 220 of the opposite first arm 204.

The alternative convertible C-clamp device 200 includes the ball-end mount or "coupler" 38 with the resiliently deformable part-spherical head 40 and formed thereon is extended from the external surface or outside 210 of the C-shaped frame 202 transversely thereof on the reduced diameter columnar stem or "neck" 42 relatively upstanding thereon. The coupler 38 is optionally positioned between the arms 204, 206 opposite from the throat 212. When the shank portion 218 of the frame 202 is present, the coupler 38 is optionally positioned thereon approximately intermediate between the arms 204, 206.

Positioning the ball-end coupler 38 on the shank portion 218 of the frame 202 is not a necessary requirement of the alternative convertible C-clamp device 200. However, as discussed herein below, such relative positioning ensures the coupler 38 will be out of the way of operating the device 200 and still be positioned in a useful place relative to the dashboard 28 or other available vehicle cockpit structure. Other positioning of the ball-end coupler 38 is also anticipated and may be may be substituted without deviating from the scope and intent of the present invention. For example, the ball-end coupler 38 may be positioned elsewhere along the shank portion 218 of the frame 202 than intermediate between the arms 204, 206, or may be positioned on the external surface or outside 210 of the second arm 206, without deviating from the scope and intent of the present invention.

A clamping rod or screw 224 is carried by the first arm 204 for longitudinal movement in a first clamping direction 225 extended toward the opposing second arm 206, and an opposite second unclamping direction 227 retracted away from the opposing second arm 206. This longitudinal movement of the clamping rod or screw 224 along the first clamping and second unclamping directions 225, 227 is preferably achieved by the free end 214 of the first opposing arm 204 having a continuously screw threaded bore 226 formed therethrough which is substantially opposite from and perpendicular to the opposing internal surface 222 of the free end 216 of the second arm 206. The rod 224 is formed with a continuous external or annular screw thread 228 structured for threadedly mating with the bore 226. The screw thread 228 permits rotational longitudinal movement of the rod 224 in the bore 226 along the first and second opposite directions 225, 227.

The clamping rod 224 is formed with respective first and second opposite outboard and inboard ends 230 and 232. The first outboard end 230 of the clamping rod 224 includes a control or drive member 234 coupled thereto in the form of a drive head. The drive head 234 is illustrated here by example and without limitation as a knurled thumb knob. However, another drive member may be substituted for the drive head 234 without deviating from the scope and intent of the present invention. Torque applied to the drive head 234 rotates the rod 224 in the bore 226, whereby that the rod 224 moves in either the first clamping or the second opposite unclamping directions 225, 227. The second inboard end 232 of the clamping rod 224 is structured to carry thereon for longitudinal movement therewith a movable clamping jaw reconfigurable between a first planar movable clamping jaw 236 and a second arched movable clamping jaw 238 that is interchangeable with the first planar movable clamping jaw 236. The planar movable clamping jaw 236 includes a substantially planar forward clamping surface 240 that is structured for contacting a substantially rectilinear surface of a target mount during a clamping operation of the convertible C-clamp device 200. The second arched movable clamping jaw 238 includes an arched forward clamping surface 242 that is structured for contacting a target mount having a substantially curved or even cylindrical mounting surface.

Formed in the manner described above, the clamping rod 224 is axially rotated in the bore 226 in a first rotational direction 244 for being moved longitudinally in the first clamping direction 225 for the clamping of the target mount therebetween. The clamping rod 224 is alternatively axially rotated in the bore 226 in an opposite second rotational direction 246 for being moved longitudinally in the second opposite direction 227 for the unclamping of the target mount. The first rotational direction 244 and opposite second rotational direction 246 are illustrated here by example and without limitation for standard right-hand or clockwise operation. The first rotational direction 244 and opposite second rotational direction 246 are optionally reversed for left-hand or counterclockwise operation without deviating from the scope and intent of the present invention.

As illustrated here and more clearly shown in subsequent figures, the planar movable clamping jaw 236 is coupled to the second inboard end 232 of the clamping rod 224 in such manner that the planar movable clamping jaw 236 may swivel in relation to the rod 224. The reconfigurable movable clamping jaw is configured by example and without limitation as a convexly rounded or part-spherical ball-shaped swivel head 248 formed on the second inboard end 232 of the rod 224 and longitudinally extend therefrom. As illustrated here and more clearly shown in subsequent figures, the first planar movable clamping jaw 236 is optionally substantially frustum-shaped having the substantially flat or planar forward clamping surface 240 and an annular skirt 252 depending rearwardly therefrom. The annular skirt 252 terminates in an entrance aperture 254 through which the swivel head 248 passes for being received in the planar movable clamping jaw 236. Placed in this manner, the planar movable clamping jaw 236 is permitted to swivel and pivot on the swivel head 248 in response to an orientation of the rectilinear surface of the target mount being clamped thereby. The planar movable clamping jaw 236 is optionally fitted with a clamping pad 256 forward of the planar forward clamping surface 240 and substantially aligned longitudinally with the clamping rod 224. The clamping pad 256 is optionally partially recessed in to the planar forward clamping surface 240, as illustrated. Furthermore, by example and without limitation, the clamping pad 256 is optionally a protective pad formed of a non-marring material such as a nylon, Teflon®, silicone or other elastomeric material. Alternatively, the clamping pad 256 is optionally a friction or non-slip pad formed of a sand paper or with a knurled or other rough surface. Optionally, the clamping pad 256 is formed of a silicone or other elastomeric material that is both a non-marring material as well as a high friction non-slip material.

Formed on the internal surface 222 of the second arm 206 adjacent to its free end 216 is a reconfigurable stationary clamping anvil 258. The reconfigurable stationary clamping anvil 258 is oriented substantially facing the opposite first arm 204 and substantially aligned longitudinally with the clamping rod or screw 224 along the first clamping and second unclamping directions 225, 227. As illustrated here by example and without limitation, the stationary clamping anvil 258 is reconfigurable between a permanent concavely arched stationary clamping anvil 260 and a discrete removably insertable planar stationary clamping anvil 262. The permanent stationary clamping anvil 260 is formed continuously with the free end 216 of the of the second arm 206 and includes an extruded substantially V-shaped or U-shaped concavely arched clamping surface 264 facing toward the first arm 204 and structured for contacting a target mount having a substantially curved or even cylindrical mounting surface. Furthermore, the substantially V-shaped clamping surface 264 of the permanent stationary clamping anvil 260 is structured to receive and retain therein the planar stationary clamping anvil 262.

The planar stationary clamping anvil 262 is structured to be received into the extruded V-shaped clamping surface 264 of the arched permanent stationary clamping anvil 260 and retained therein. By example and without limitation, the reconfigurable stationary clamping anvil 258 is structured to threadedly receive a screw or other fastener 266 passing through a portion of the planar stationary clamping anvil 262, with the planar stationary clamping anvil 262 being retained thereby. Furthermore, the planar stationary clamping anvil 262 includes one or more substantially planar clamping surfaces 268 structured for contacting a substantially rectilinear surface of a target mount during a clamping operation of the convertible C-clamp device 200. If multiple clamping surfaces 268 are present, all clamping surfaces 268 are expected to be substantially coplanar and substantially symmetrically positioned relative to the fastener 266.

Each clamping surface 268 is optionally fitted with a clamping pad 270. By example and without limitation, each clamping pad 270 is optionally a protective pad formed of a non-marring material such as a nylon, Teflon®, silicone or other elastomeric material. Alternatively, each clamping pad 270 is optionally a friction or non-slip pad formed of a sand paper or with a knurled or other rough surface. Optionally, each clamping pad 270 is formed of a silicone or other elastomeric material that is both a non-marring material as well as a high friction non-slip material.

Figure 17:
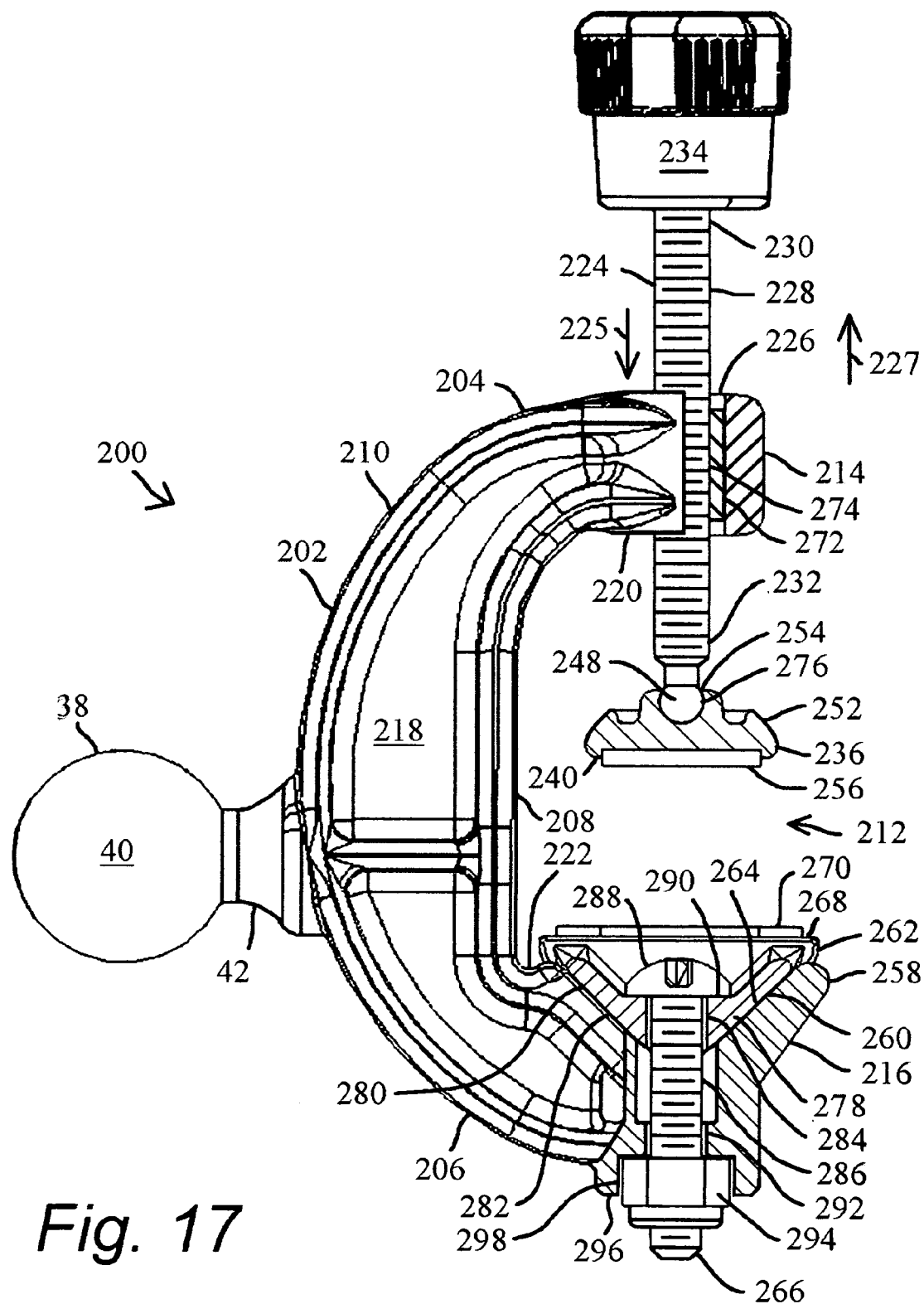
FIG. 17 is a partial cross-sectional view of the novel convertible C-clamp device.

FIG. 17 is a partial cross-sectional view of the convertible C-clamp device 200 wherein the continuously screw threaded bore 226 is provided by example and without limitation by a threaded insert 272 retained in a bore 274 formed through the free end 214 of the first opposing arm 204 and aligned along the first clamping and second unclamping directions 225, 227.

As illustrated here, the second inboard end 232 of the rod 224 is formed with the rounded or convex ball-shaped swivel head 248 that is longitudinally extend therefrom. The planar movable clamping jaw 236 is coupled to the swivel head 248 in such manner that the planar movable clamping jaw 236 may swivel thereabout in relation to the rod 224. For example, the aperture 254 that terminates the annular skirt 252 opens into a concave part-spherical chamber or socket 276 within the planar movable clamping jaw 236 into which the swivel head 248 is received. The concave part-spherical socket 276 is formed to make the planar movable clamping jaw 236 angularly rotatable about the swivel head 248. Furthermore, the swivel head 248 is rotationally rotatable in the part-spherical socket 276 relative to the longitudinal axis of the clamping rod or screw 224 about first clamping and second unclamping directions 225, 227. Accordingly, rotatable coupling of the part-spherical socket 276 with the swivel head 248 permits the planar movable clamping jaw 236 to spin, swivel and pivot on the second inboard end 232 of the clamping rod or screw 224 in response to different orientations of the rectilinear surface of the target mount being clamped thereby.

As illustrated here by example and without limitation, the reconfigurable stationary clamping anvil 258 is structured as the arched permanent stationary clamping anvil 260 having the substantially V-shaped clamping surface 264 that is structured for receiving and retaining the insertable planar clamping anvil 262. For example, the insertable planar stationary clamping anvil 262 is formed with a complementary extruded convexly arched base 278 structured to fit snuggly into the extruded concavely arched clamping surface 264 of the arched permanent stationary clamping anvil 260.

Here by example and without limitation, the insertable planar stationary clamping anvil 262 is formed with a complementary extruded V-shaped base 278 structured to fit snuggly into the extruded V-shaped clamping surface 264 of the arched permanent stationary clamping anvil 260.

By example and without limitation, the extruded V-shaped clamping surface 264 of the arched permanent stationary clamping anvil 260 and the complementary extruded V-shaped base 278 of the insertable planar stationary clamping anvil 262 are formed with respective substantially planar complementary inside and outside wall surfaces 280 and 282. The planar stationary clamping anvil 262 is further formed with a substantially smooth clearance bore 284 substantially central of the extruded V-shaped base 278 and sized to slidingly receive only a shank portion 286 of the fastener 266 therethrough without passing a head portion 288 thereof. The clearance bore 284 is surrounded by a seat 290 that is recessed relative to the clamping surface 268. When multiple clamping surfaces 268 are present, the multiple clamping surfaces 268 are spaced apart with the clearance bore 284 formed substantially symmetrically therebetween.

The V-shaped clamping surface 264 includes a complementary bore 292 formed in the internal surface 222 of the free end 216 of the second arm 206. The bore 292 is positioned substantially central of the extruded V-shaped clamping surface 264 and substantially aligned with the bore 274 formed through the free end 214 of the opposing first arm 204 and having the threaded insert 272 retained therein for the clamping rod or screw 224.

The free end 216 of the second arm 206 also includes a complementary threaded retainer 294 formed to mate with the fastener 266. The complementary threaded retainer 294 is positioned substantially central of the extruded V-shaped clamping surface 264 and substantially aligned with the bore 274 through the free end 214 of the first arm 204. By example and without limitation, the complementary threaded retainer 294 is provided by complementary screw threads formed in the bore 292 and matched to the fastener 266.

Alternatively, the bore 292 is a substantially smooth clearance bore formed through to an opposing external surface 296 of the second arm 206 and is sized to slidingly receive the shank portion 286 of the fastener 266 therethrough. Thus, the bore 292 provides clearance for the fastener 266 through the free end 216 of the second arm 206. When the bore 292 is a clearance bore, the complementary threaded retainer 294 is provided by a nut threaded to match the fastener 266 is provided on an opposite end of the clearance bore 292 from the reconfigurable stationary clamping anvil 258. The nut-type threaded retainer 294 threadedly receives the fastener 266 for retaining the planar stationary clamping anvil 262 relative to the concavely arched V-shaped clamping surface 264 of the permanent stationary clamping anvil 260. Optionally, a recessed nut pocket 298 is provided on the external surface 296 of the second arm 206 for retaining the threaded retainer 294, when embodied as the nut, and restricting same from turning when the fastener 266 is installed.

Figure 18:
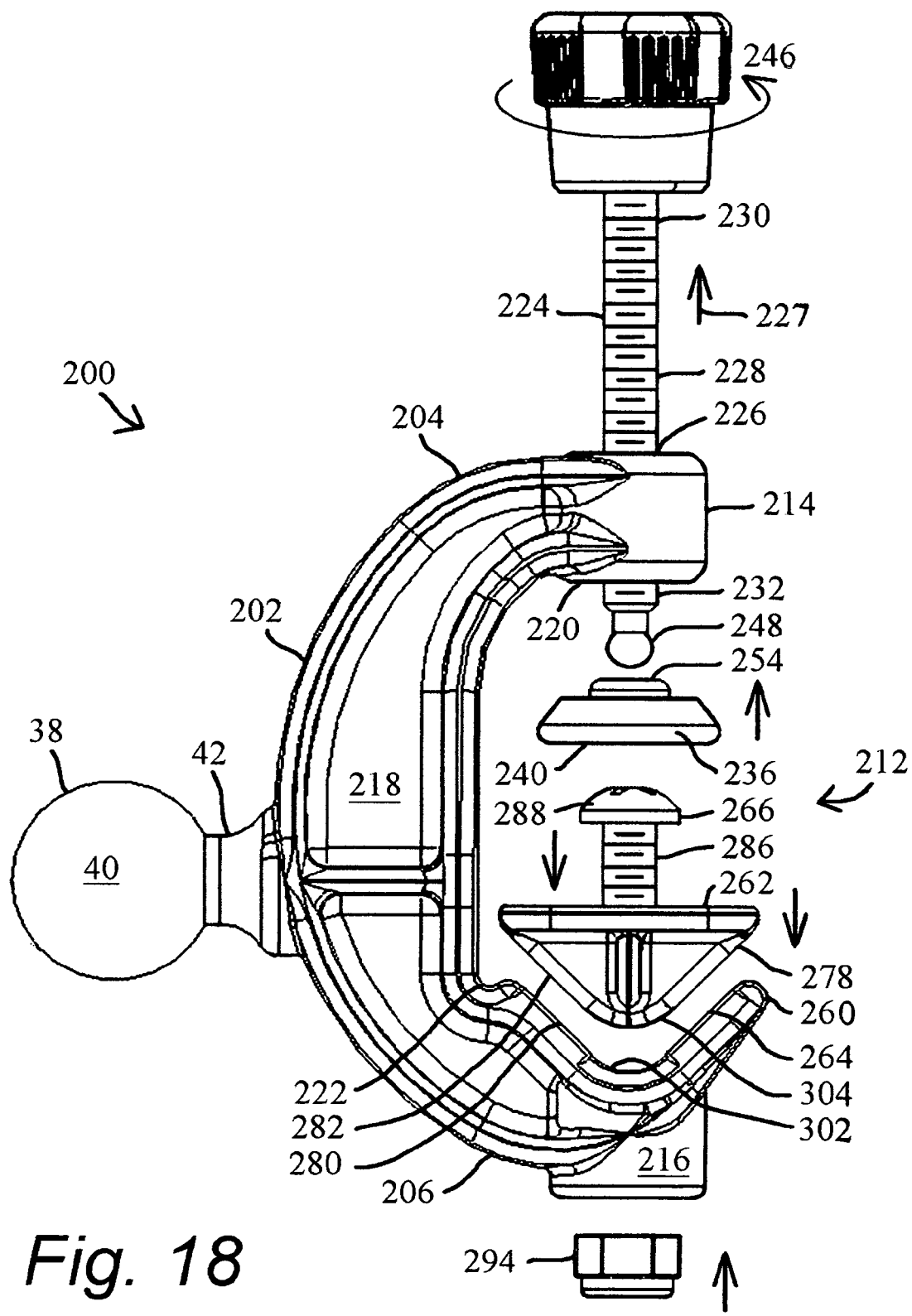
FIG. 18 illustrates assembly of the novel convertible C-clamp device.

FIG. 18 illustrates assembly of the alternative convertible C-clamp device 200 in a configuration for clamping on to a target mounting having a pair of opposing substantially rectilinear surfaces. Accordingly, the knurled thumb knob or other drive head 234 is rotated in the second rotational direction 246 for retracting the clamping rod or screw 224 longitudinally along the second unclamping direction 227 away from the second arm 206. The clamping rod or screw 224 is retracted along the second unclamping direction 227 at least far enough to fit the first planar movable clamping jaw 236 between the swivel head 248 formed on the second inboard end 232 of the rod 224 and the free end 216 of the second arm 206.

The rod's swivel head 248 is received through the aperture 254 and into the part-spherical socket 276 within the annular skirt 252 of the planar movable clamping jaw 236 in such manner that the planar movable clamping jaw 236 may swivel and rotate thereabout in relation to the rod 224.

The insertable planar stationary clamping anvil 262 is received into the concavely arched permanent stationary clamping anvil 260 with the planar clamping surfaces 268 facing toward the first arm 204 and the planar movable clamping jaw 236. The complementary extruded V-shaped base 278 of the planar stationary clamping anvil 262 is fit snuggly into the extruded concavely arched V-shaped clamping surface 264 of the permanent stationary clamping anvil 260. The outside wall surfaces 282 of the planar stationary clamping anvil 262 contact the complementary inside wall surfaces 280 of the arched permanent stationary clamping anvil 260.

Furthermore, as illustrated here by example and without limitation, the extruded V-shaped clamping surface 264 of the arched permanent stationary clamping anvil 260 is formed with an internal concave arcuate base surface 302 between its planar inside wall surfaces 280, and the complementary extruded V-shaped base 278 of the planar stationary clamping anvil 262 is formed with an external convex arcuate apex surface 304 complementary of the internal concave arcuate base surface 302 of the arched permanent stationary clamping anvil 260. During insertion of the planar stationary clamping anvil 262 into the complementary arched permanent stationary clamping anvil 260, the arcuate apex surface 304 is received into the complementary arcuate base surface 302 when the outside wall surfaces 282 of the planar stationary clamping anvil 262 are mated with the complementary inside wall surfaces 280 of the arched permanent stationary clamping anvil 260.

The position of the extruded V-shaped base 278 of the planar stationary clamping anvil 262 is adjusted relative to the complementary the extruded arched V-shaped clamping surface 264 of the permanent stationary clamping anvil 260 until the clearance bore 284 in the planar stationary clamping anvil 262 is substantially aligned with the complementary bore 292 in the internal surface 222 of the free end 216 of the second arm 206.

The shank portion 286 of the screw or other fastener 266 is passed through the clearance bore 284 in the planar stationary clamping anvil 262 and into the complementary bore 292 in the internal surface 222 of the free end 216 of the second arm 206. The shank 286 of the fastener 266 is turned into the complementary threaded retainer 294 until the head 288 is firmly set against the seat 290 surrounding the clearance bore 284.

If the complementary bore 292 is threaded to match the fastener 266, then the shank 286 of the fastener 266 is turned thereinto. Else, if the complementary bore 292 is a clearance bore and the complementary threaded retainer 294 is provided by the nut 294, then the nut 294 is positioned on the external surface 296 of the second arm 206. If the nut pocket 298 is present, the nut is inserted thereinto for restricting same from turning when the fastener 266 is installed.

With the planar movable clamping jaw 236 coupled to the swivel head 248 of the threaded rod 224 and the planar stationary clamping anvil 262 thus firmly seated and fastened in the arched permanent stationary clamping anvil 260, the C-clamp device 200 is configured for clamping onto a target mount having an opposing pair of substantially rectilinear surfaces.

Figure 19:
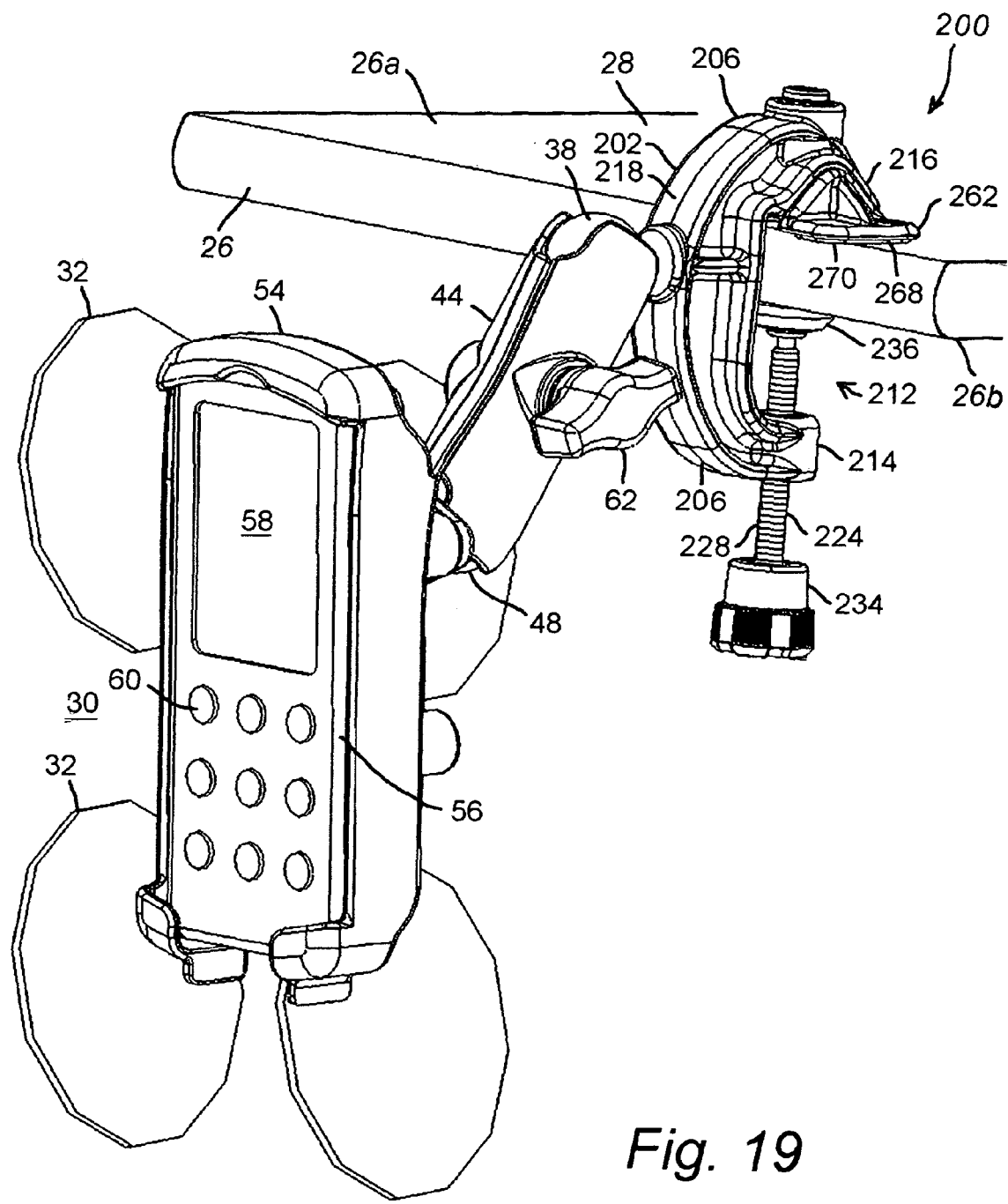
FIG. 19 illustrates the novel convertible C-clamp device configured as illustrated in FIG. 18 and clamped onto a target mount having an opposing pair of substantially rectilinear surfaces.

FIG. 19 illustrates the C-clamp device 200 configured as illustrated in FIG. 18 and clamped onto a target mount having an opposing pair of substantially rectilinear surfaces. By example and without limitation, the C-clamp device 200 is clamped to the edge protrusion 26 of the cockpit dashboard 28 with the ball-end coupler 38 projected away from the edge protrusion 26. Furthermore, the split-arm socket assembly 44 cooperates with the first ball-end coupler 38 and the second ball-end coupler 48 to position the instrument tray 54. Cooperation of the ball-end coupler 38 of the C-clamp device 200 with the split-arm socket assembly 44 and second ball-end coupler 48 furthermore permits positioning of the instrument tray 54 such that view of the instruments 32 is not obscured. With the instrument tray 54 so positioned relative to the dashboard edge protrusion 26, the position and orientation of the instrument 56 are adjusted until a lightable display screen 58 and keypad 60 (if present) of the instrument 56 are appropriately positioned, for example in the shadowed area 34 cast by the cockpit dashboard 28 yet out of line-of-sight of instruments 32 on the instrument panel 30, and the display screen 58 and keypad 60 (if present) are appropriately oriented for viewing. The display screen 58 and keypad 60 (if present) are thus optionally cast into shadow that ambient light does not wash out images displayed thereon. The instrument 56 is thus readable at a glance, even when the display screen 58 is of the LCD variety, but does not interfere with viewing the permanent cockpit instruments 32. When the instrument 56 is appropriately positioned with the display screen 58 and keypad 60 (if present) in the shadowed area 34 cast by the cockpit dashboard 28, a knob 62 portion of a clamping mechanism 64 is tightened relative to the split-arm assembly 44, which effectively interlocks the split-arm assembly 44 with the first and second ball-end couplers 38, 48 to retain the selected positioning.

Figure 20:
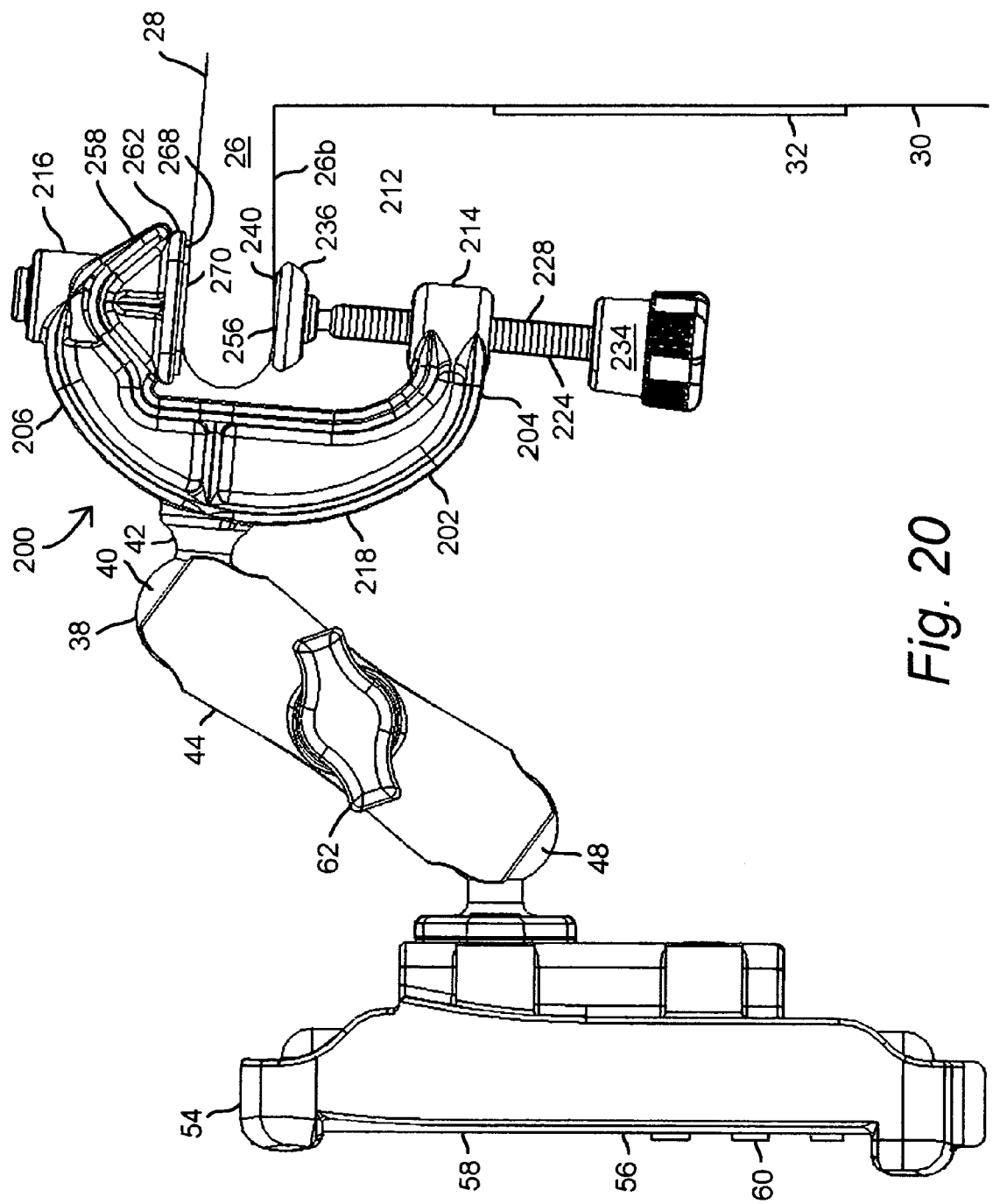
FIG. 20 is a side view more clearly showing the novel convertible C-clamp device 200 clamped to the edge protrusion of the cockpit dashboard with the ball-end coupler projected into the cockpit.

FIG. 20 is a side view more clearly showing the alternative convertible C-clamp device 200 clamped to the edge protrusion 26 of the cockpit dashboard 28 with the ball-end coupler 38 projected into the cockpit. As illustrated here, while not a necessary requirement of the alternative convertible C-clamp device 200, relative positioning the ball-end coupler 38 on the shank portion 218 of the frame 202 ensures the ball-end coupler 38 is positioned in a useful place relative to the edge protrusion 26 of the cockpit dashboard 28. Furthermore, positioning the ball-end coupler 38 on the shank portion 218 of the frame 202 as illustrated here is unnecessary to operation of the C-clamp device 200. However, such positioning of the ball-end coupler 38 relative to the arms 204, 206 of the frame 202 remains the most versatile configuration of the C-clamp device 200.

Here, the C-clamp device 200 is shown more clearly having the arms 204, 206 of the C-shaped frame 202 wrapped around the cockpit dashboard 28 so the edge protrusion 26 is extended deep into a substantially rectangular throat portion 212 formed therebetween. The dashboard edge protrusion 26 is shown here nearly butted against the internal surface or inside 208 of the frame 202. The C-shaped frame 202 of the C-clamp device 200 is shown more clearly having the clamping surfaces 268 of the planar stationary clamping anvil 262 being secured against the upper surface 26a of the cockpit dashboard edge protrusion 26. The screw thread 228 of the threaded rod 224 are turned in the first rotational direction 244 through the screw threaded bore 226 such that the first planar movable clamping jaw 236 is driven along the first clamping direction 225. The planar movable clamping jaw 236 is thus driven toward the cockpit dashboard edge protrusion 26 until its planar forward clamping surface 240 is seated against the under surface 26b of the cockpit dashboard edge protrusion 26 to secure the clamping surfaces 268 of the planar stationary clamping anvil 262 against the upper cockpit dashboard edge protrusion surface 26a for holding the convertible C-clamp device 200 in the selected position relative to the cockpit dashboard 28. As illustrated here, the combined rotatable and swivelable relationship of the planar movable clamping jaw 236 with the swivel head 248 of the clamping rod 224 ensures the planar forward clamping surface 240 is permitted to seat against the under surface 26b of the cockpit dashboard edge protrusion 26 even when it is not parallel with the upper surface 26a.

Figure 21:
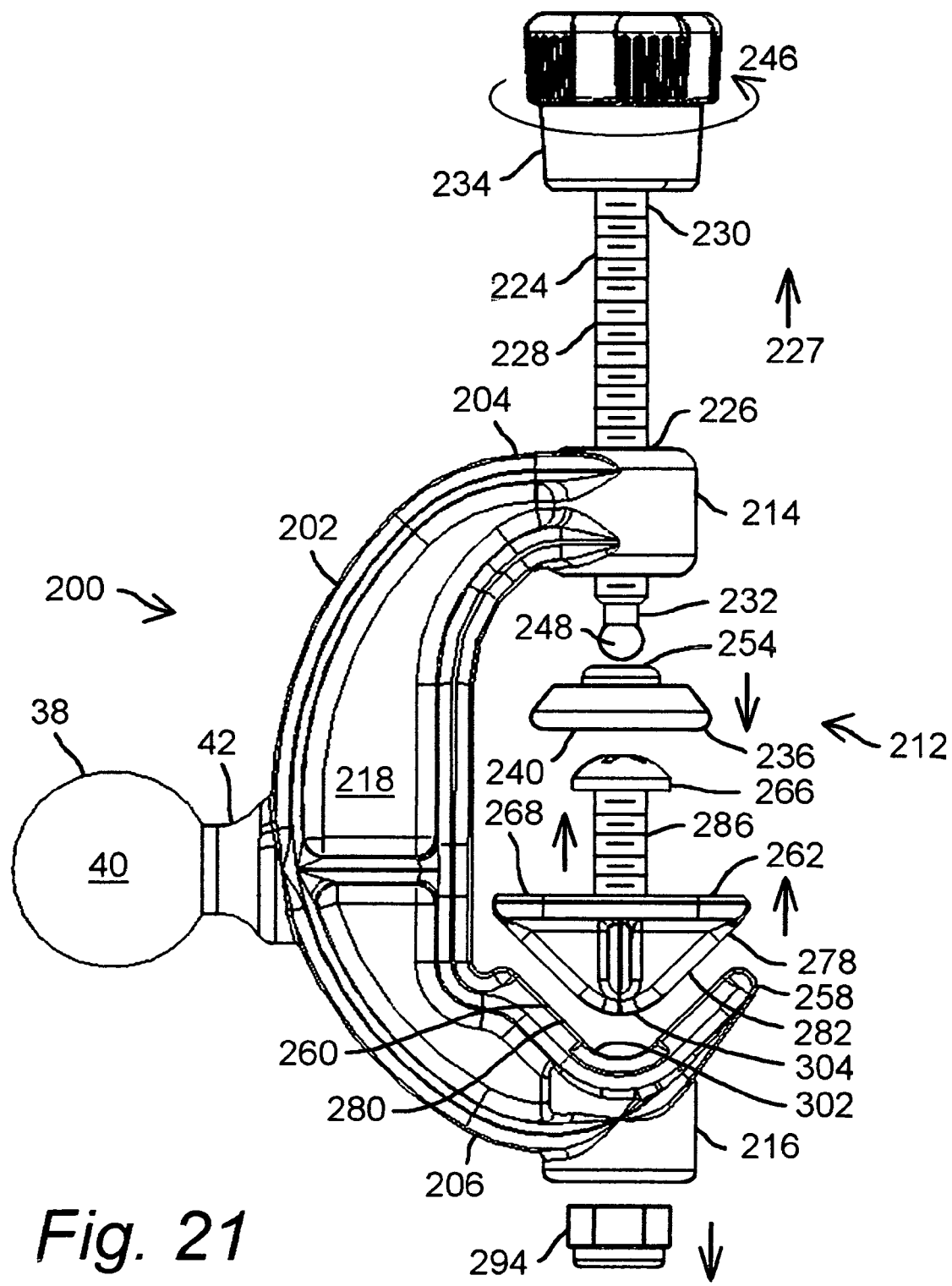
FIG. 21 illustrates disassembly of the novel convertible C-clamp device from the configuration of FIG. 20 for clamping on to a target mounting having a substantially curved or cylindrical mounting surface.

FIG. 21 illustrates disassembly of the alternative convertible C-clamp device 200 from the configuration of FIG. 20 for clamping on to a target mounting having a substantially curved or cylindrical mounting surface. Accordingly, the knurled thumb knob or other drive head 234 is rotated in the second rotational direction 246 for retracting the clamping rod or screw 224 longitudinally along the second unclamping direction 227 away from the second arm 206. The clamping rod or screw 224 is retracted along the second unclamping direction 227 at least far enough to remove the first planar movable clamping jaw 236 from the swivel head 248 formed on the second inboard end 232 of the rod 224 and the free end 216 of the second arm 206. The rod's swivel head 248 is retracted through the aperture 254 and out of the part-spherical socket 276 of the annular skirt 252 for removing the planar movable clamping jaw 236 from the rod 224.

The shank portion 286 of the screw or other fastener 266 is turned out of the complementary threaded retainer 294 until the fastener 266 can be removed from the frame 202.

If present, the nut 294 is removed.

With the fastener 266 removed, the insertable planar stationary clamping anvil 262 is removed from the arched permanent stationary clamping anvil 260. The extruded arched V-shaped clamping surface 264 of the permanent stationary clamping anvil 260 is thus exposed in a position for clamping.

With the planar movable clamping jaw 236 removed from the swivel head 248 of the threaded rod 224 and the insertable planar stationary clamping anvil 262 removed from the arched permanent stationary clamping anvil 260, the C-clamp device 200 is ready to be reconfigured for clamping instead on to a target mounting having a substantially curved or cylindrical mounting surface.

Figure 22:
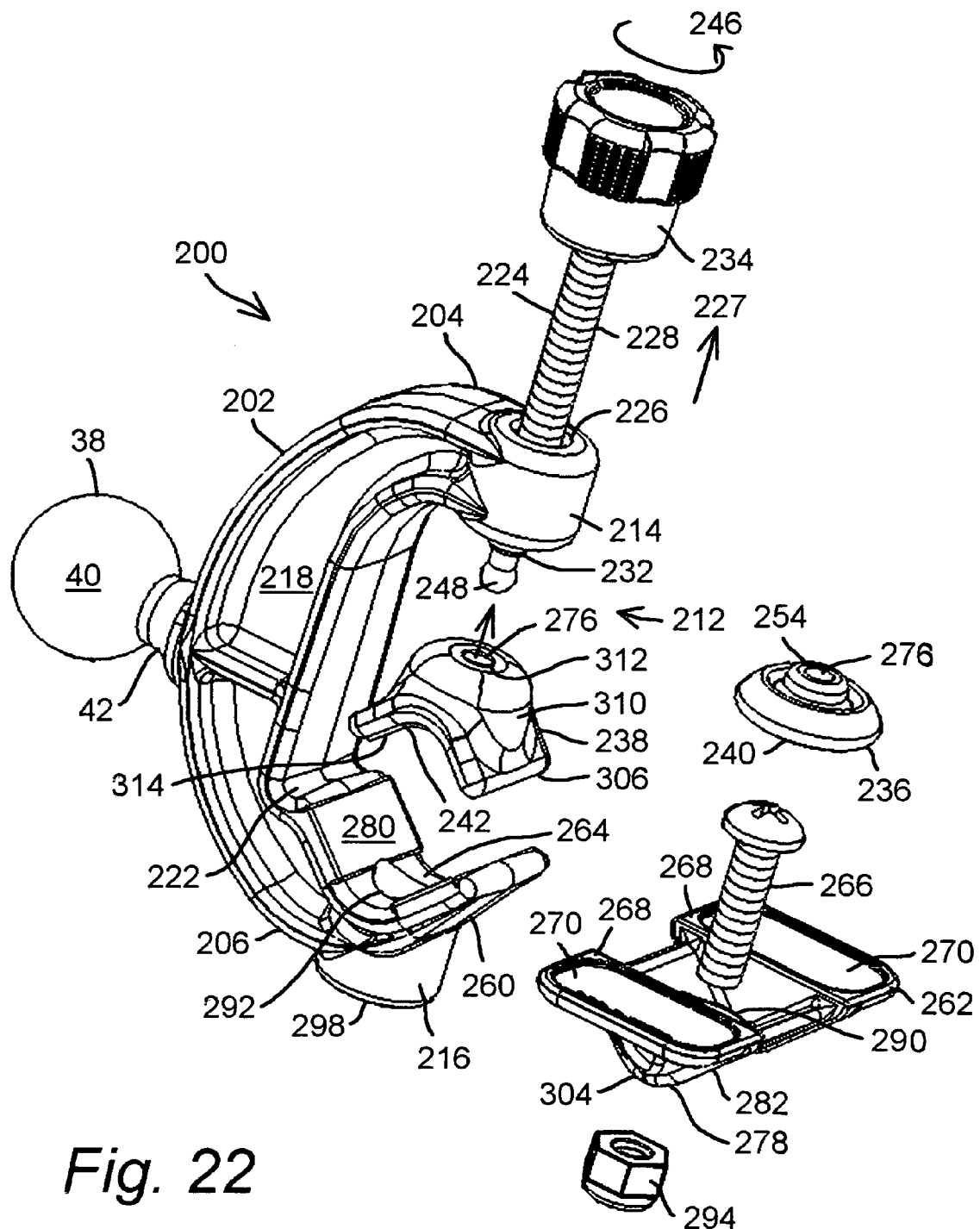
FIG. 22 illustrates assembly of the novel convertible C-clamp device into a configuration for clamping on to a target mounting having a substantially curved or cylindrical mounting surface.

FIG. 22 illustrates assembly of the alternative convertible C-clamp device 200 into a configuration for clamping on to a target mounting having a substantially curved or cylindrical mounting surface.

Accordingly, with the planar movable clamping jaw 236 removed from the swivel head 248 of the threaded rod 224, the swivel head 248 is spaced far enough from the free end 216 of the second arm 206 to fit the second arched movable clamping jaw 238 therebetween. For example, as discussed herein above, the rod 224 may be already sufficiently retracted from disassembling the planar movable clamping jaw 236 from the swivel head 248. Else, the thumb knob or other drive head 234 is rotated in the second rotational direction 246 for retracting the clamping rod or screw 224 longitudinally along the second unclamping direction 227 until he clamping screw 224 is sufficiently retracted relative to the first arm 204 at least to fit the second arched movable clamping jaw 238 between the swivel head 248 and the free end 216 of the second arm 206.

As illustrated here, the second arched movable clamping jaw 238 is optionally formed as an extruded V-shaped or U-shaped arch surface 306 oriented nominally transversely of the clamping rod 224. The extruded arch 306 of the arched forward clamping surface 242 is thus substantially self-aligning with a target mount having a substantially curved or cylindrical mounting surface. The arched movable clamping jaw 238 is further formed with an annular skirt 310 depending rearwardly from the extruded arch 306. The annular skirt 310 terminates in an entrance aperture 312 through which the swivel head 248 passes for being received into another part-spherical socket 276 in the arched movable clamping jaw 238, which is twin to the part-spherical socket 276 within the planar movable clamping jaw 236 and formed to freely rotate and swivel about the ball-shaped swivel head 248 on the second inboard end 232 of the clamping rod or screw 224 in response to different orientations of the substantially curved or cylindrical surface of the target mount being clamped thereby.

The rod's swivel head 248 is received through the aperture 312 and into the part-spherical socket 276 within the annular skirt 310 of the second arched movable clamping jaw 238 in such manner that the second arched movable clamping jaw 238 may spin, swivel and rotate thereabout in relation to the rod 224. The second arched movable clamping jaw 238 may therefore rotate on the rod's swivel head 248 such that the extruded arch 306 may be rotated for substantially self-aligning the extruded arch forward clamping surface 242 with the arched permanent stationary clamping anvil 260 in response to an orientation of the substantially curved or cylindrical mounting surface of the target mount being clamped thereby.

The arched movable clamping jaw 238 is optionally fitted with a clamping pad 314 forward of the extruded arch forward clamping surface 242 and substantially aligned longitudinally with the clamping rod 224. By example and without limitation, the clamping pad 314 is optionally a protective pad formed of a non-marring material such as a nylon, Teflon®, silicone or other elastomeric material. Alternatively, the clamping pad 314 is optionally a friction or non-slip pad formed of a sand paper or with a knurled or other rough surface. Optionally, the clamping pad 314 is formed of a silicone or other elastomeric material that is both a non-marring material as well as a high friction non-slip material.

With the nut 294, fastener 266 and insertable planar stationary clamping anvil 262 removed from the arched permanent stationary clamping anvil 260 and the second arched movable clamping jaw 238 coupled to the swivel head 248 of the threaded rod 224, the C-clamp device 200 is reconfigured for clamping onto a target mounting having a substantially curved or cylindrical mounting surface.

Figure 23:
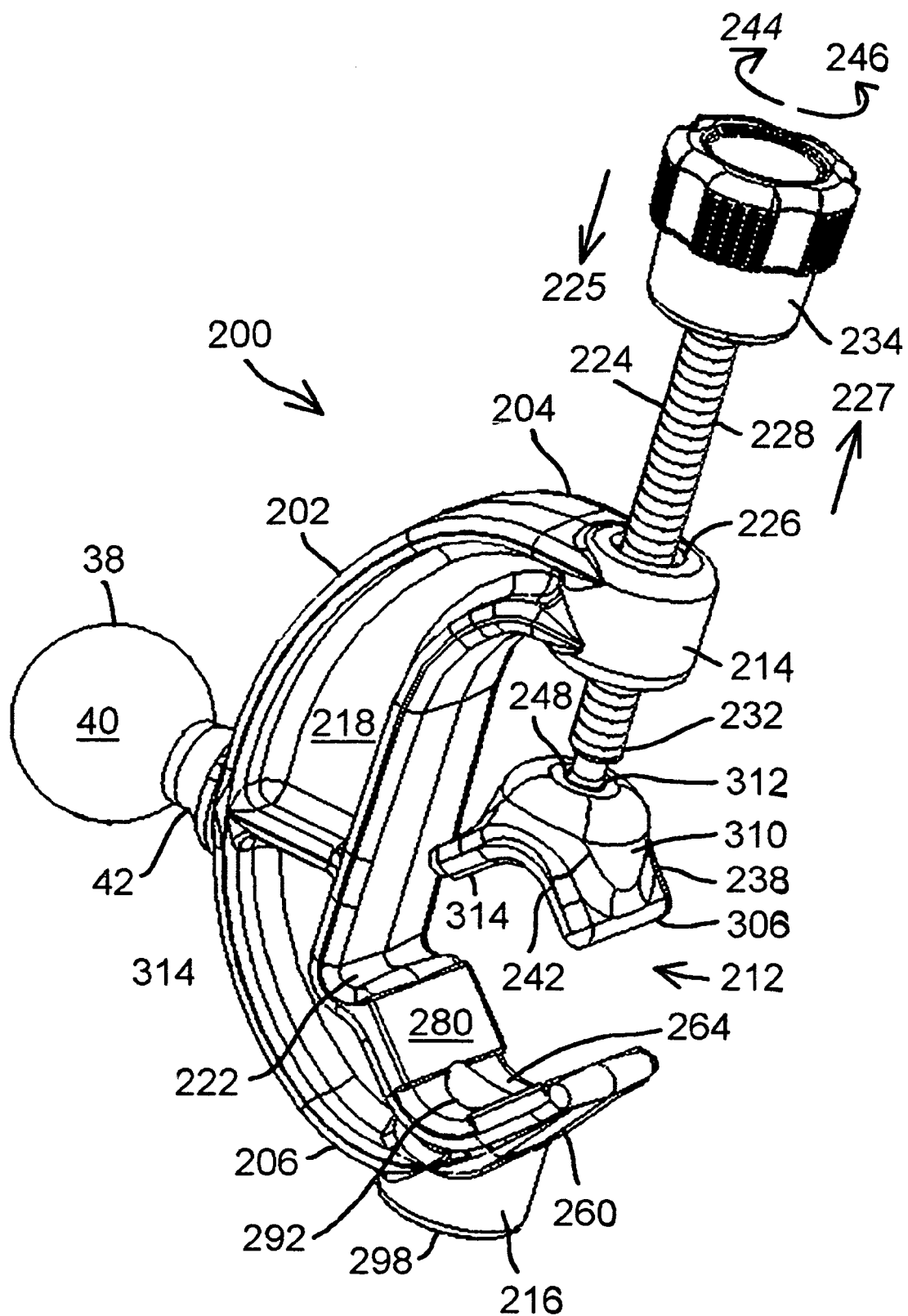
FIG. 23 illustrates the novel convertible C-clamp device configured for clamping on to a target mounting having a substantially curved or cylindrical mounting surface.

FIG. 23 illustrates the alternative convertible C-clamp device 200 having the nut 294, fastener 266 and insertable planar stationary clamping anvil 262 removed from the arched permanent stationary clamping anvil 260, and the second arched movable clamping jaw 238 coupled to the swivel head 248 of the threaded rod 224. Accordingly, the alternative convertible C-clamp device 200 is configured in a configuration for clamping on to a target mounting having a substantially curved or cylindrical mounting surface. With the threaded rod 224 retracted relative to the first arm 204 and the planar stationary clamping anvil 262 removed, as illustrated, the C-clamp device 200 is configured to receive between the second arched movable clamping jaw 238 and the arched permanent stationary clamping anvil 260 a target mount having a substantially curved or cylindrical mounting surface.

Figure 24:
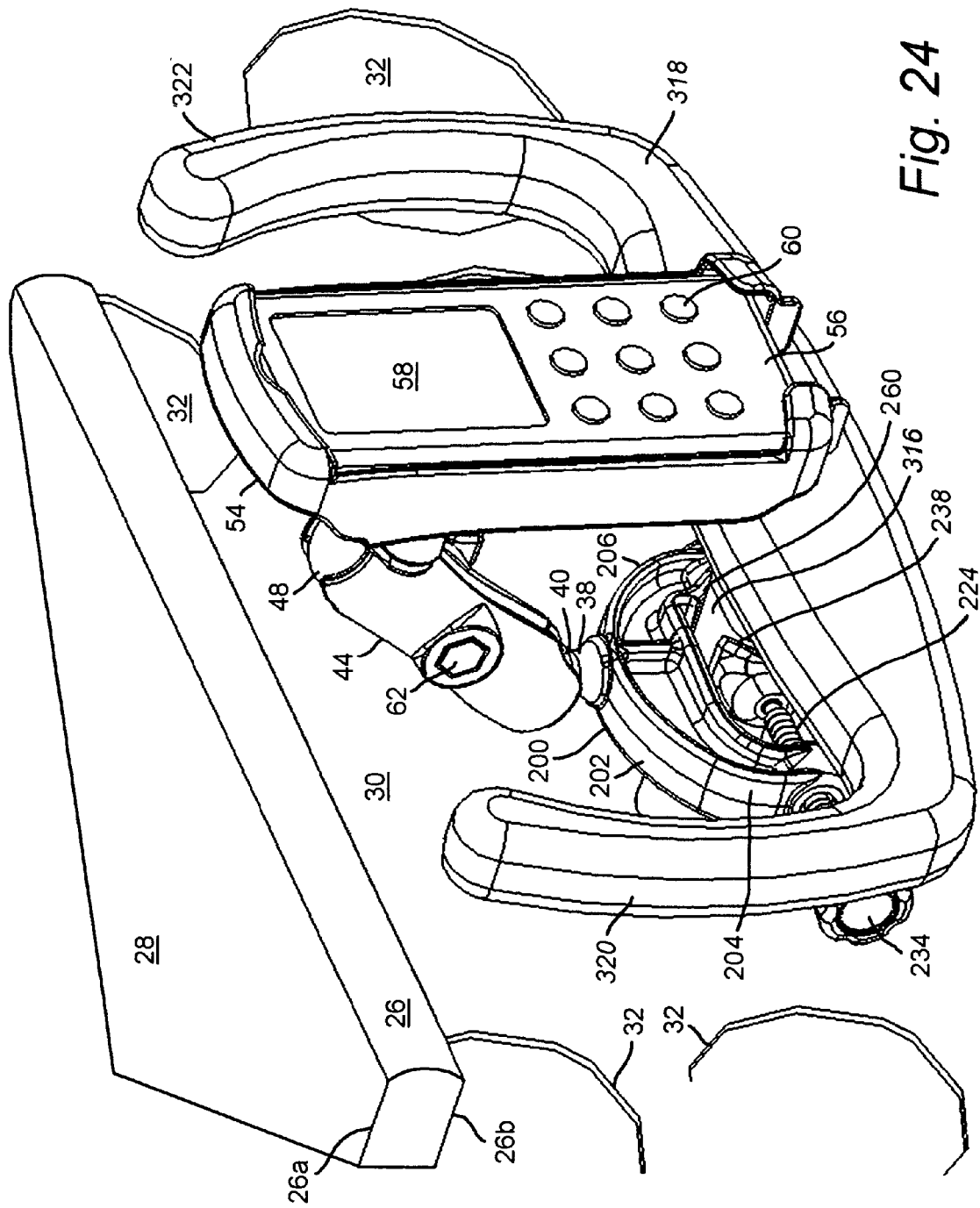
FIG. 24 illustrates the novel C-clamp device configured as illustrated in FIG. 23 and clamped onto a target mount having a substantially curved or cylindrical mounting surface.

FIG. 24 illustrates the C-clamp device 200 configured as illustrated in FIG. 23 and clamped onto a target mount having a substantially curved or cylindrical mounting surface. As illustrated here, a substantially horizontal control column 316 is extended from the instrument panel 30 beneath the overhanging cockpit dashboard 28 and carrying a pilot operated control yoke 318. The control column 316 is, for example, of a type having a substantially curved or cylindrical mounting surface.

The C-clamp device 200 is clamped to the control column 316. Accordingly, the control column 316 is positioned between the first and second arms 204, 206 of the C-shaped frame 202, and the substantially curved or cylindrical mounting surface thereof is clamped between the second arched movable clamping jaw 238 and the arched permanent stationary clamping anvil 260. As illustrated, the C-clamp device 200 is clamped with the ball-end coupler 38 projected away from the control column 316 upwardly toward the overhanging cockpit dashboard 28.

Furthermore, the split-arm socket assembly 44 cooperates with the first and second ball-end couplers 38, 48 to position the instrument tray 54 between opposing spaced-apart control arms 320 and 322 of the control yoke 318. Cooperation of the ball-end coupler 38 of the C-clamp device 200 with the split-arm socket assembly 44 and second ball-end coupler 48 furthermore permits positioning of the instrument tray 54 such that view of the instruments 32 is not obscured. With the instrument tray 54 so positioned relative to the control column 316 and control yoke 318, the position and orientation of the instrument 56 are adjusted until a lightable display screen 58 and keypad 60 (if present) of the instrument 56 are appropriately positioned, for example between the control arms 320 and 322 of the control yoke 318 yet out of line-of-sight of instruments 32 on the instrument panel 30, and the display screen 58 and keypad 60 (if present) are appropriately oriented for viewing. The display screen 58 is thus readable at a glance, and the keypad 60 (if present) is accessible for operation, but the instrument 56 does not interfere with either operating the control yoke 318 or viewing the permanent cockpit instruments 32. When the instrument 56 is appropriately positioned, the knob 62 portion of the clamping mechanism 64 is tightened relative to the split-arm assembly 44, which effectively interlocks the split-arm assembly 44 with the first and second ball-end couplers 38, 48 to retain the selected positioning. The instrument 56 is optionally appropriately positioned with the display screen 58 and keypad 60 (if present) in the shadowed area 34 cast by the overhanging cockpit dashboard 28.

Figure 25:
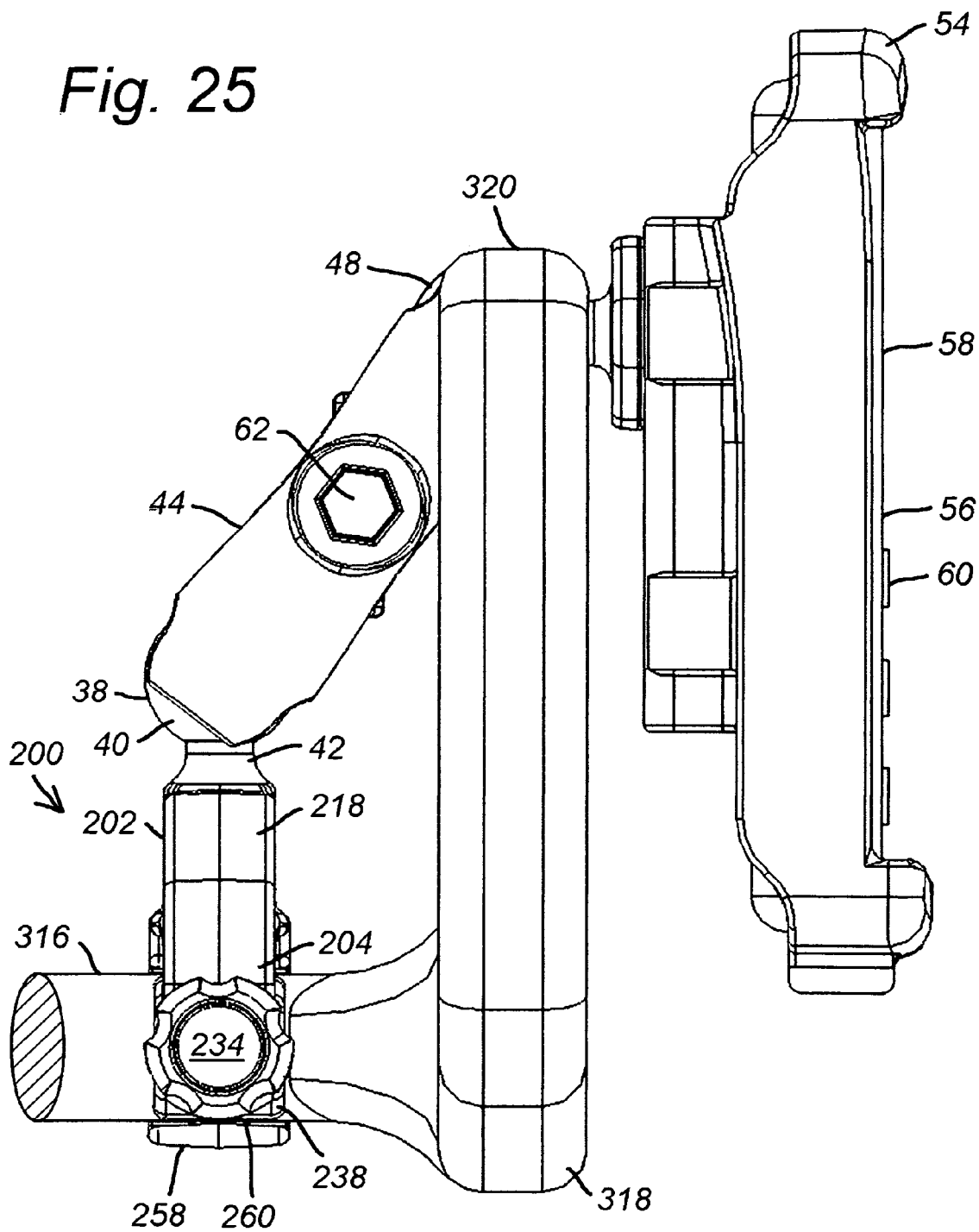
FIG. 25 is a side view more clearly showing the novel convertible C-clamp device clamped to the control column of an aircraft between the control yoke and the instrument panel with the ball-end coupler projected away from the control column upwardly toward the overhanging cockpit dashboard.

FIG. 25 is a side view more clearly showing the alternative convertible C-clamp device 200 clamped to the control column 316 between the control yoke 318 and the instrument panel 30 with the ball-end coupler 38 projected away from the control column 316 upwardly toward the overhanging cockpit dashboard 28. As illustrated here, while not a necessary requirement of the alternative convertible C-clamp device 200, relative positioning the ball-end coupler 38 on the shank portion 218 of the frame 202 ensures the ball-end coupler 38 is positioned in a useful place relative to the control yoke 318. Furthermore, positioning the ball-end coupler 38 on the shank portion 218 of the frame 202 as illustrated here is unnecessary to operation of the C-clamp device 200. However, such positioning of the ball-end coupler 38 relative to the arms 204, 206 of the frame 202 remains the most versatile configuration of the C-clamp device 200.

Here, the C-clamp device 200 is shown more clearly having the arms 204, 206 of the C-shaped frame 202 wrapped around the control column 316 with the substantially curved or cylindrical mounting surface thereof being clamped between the second arched movable clamping jaw 238 and the arched permanent stationary clamping anvil 260. The C-shaped frame 202 of the C-clamp device 200 is shown more clearly having the extruded arch forward clamping surface 242 of the second arched movable clamping jaw 238 being secured against the substantially curved or cylindrical mounting surface of the control column 316. The screw thread 228 of the threaded rod 224 are turned in the first rotational direction 244 through the screw threaded bore 226 such that the second arched movable clamping jaw 238 is driven along the first clamping direction 225. The second arched movable clamping jaw 238 is thus driven toward the control column 316 until its extruded arch forward clamping surface 242 is seated against the substantially curved or cylindrical mounting surface of the control column 316 to secure the arched forward clamping surface 242 of the second arched movable clamping jaw 238 against the control column 316 for holding the convertible C-clamp device 200 in the selected position relative to the control yoke 318. As illustrated here, the combined rotatable and swivelable relationship of the second arched movable clamping jaw 238 with the swivel head 248 of the clamping rod 224 ensures the extruded arch forward clamping surface 242 is permitted to self-align with and seat against the substantially curved or cylindrical mounting surface of the control column 316.

Figure 26:
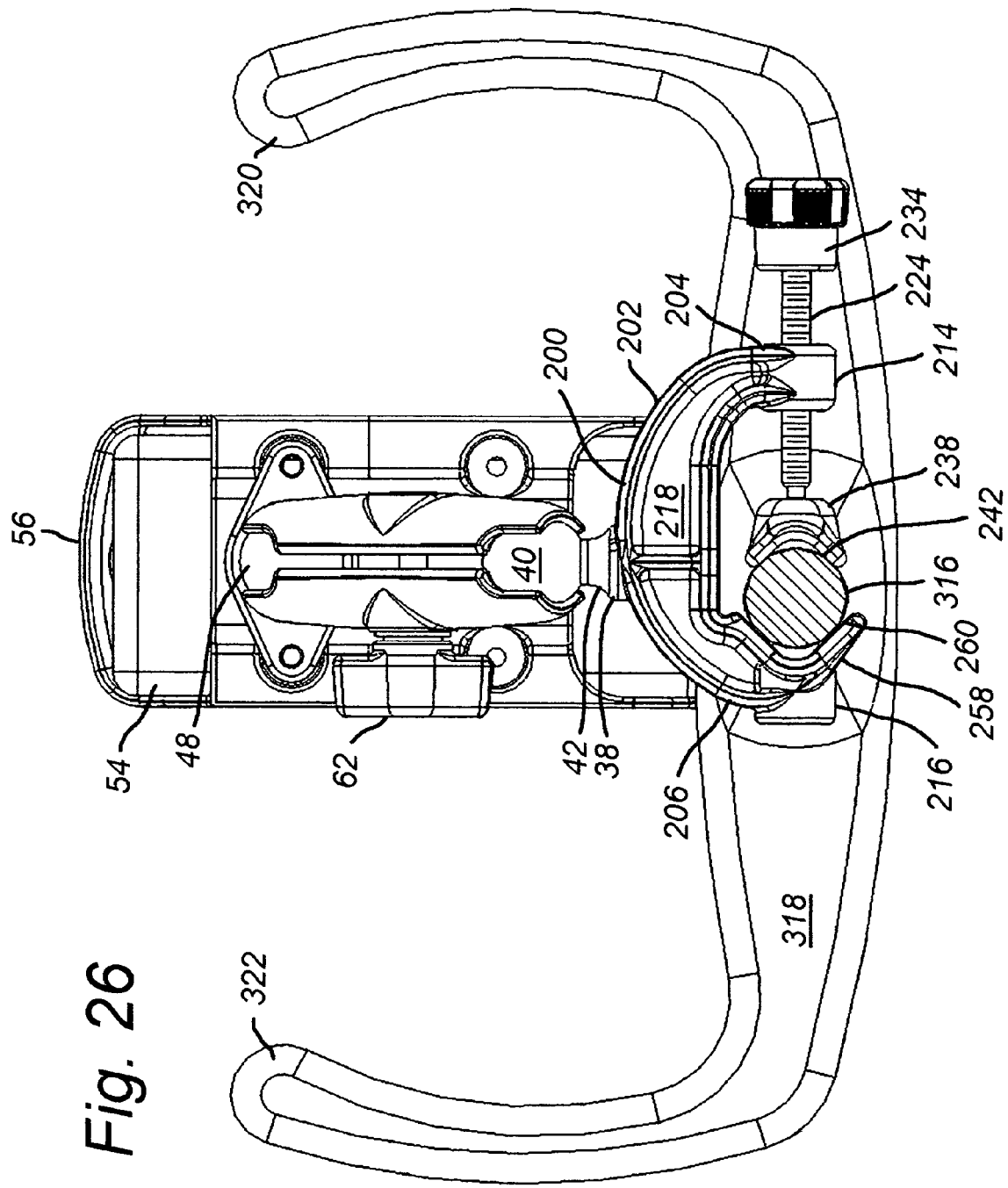
FIG. 26 is an end view looking into the cockpit from the instrument panel that illustrates the novel convertible C-clamp device clamped to the substantially cylindrical control column forward of the control yoke and having the ball-end coupler projected upwardly away from the control column.

FIG. 26 is an end view looking into the cockpit from the instrument panel 30 that shows the alternative convertible C-clamp device 200 clamped to the substantially cylindrical control column 316 forward of the control yoke 318 and having the ball-end coupler 38 projected upwardly away from the control column 316. As illustrated here, while not a necessary requirement of the alternative convertible C-clamp device 200, the ball-end coupler 38 is extended on the shank portion 218 of the frame 202 in a position spaced adjacent to the second arm 206 having the stationary clamping anvil 258.

As illustrated here, such relative positioning adjacent to the second arm 206 ensures the ball-end coupler 38 is positioned in a useful place relative to the control yoke 318. Furthermore, positioning the ball-end coupler 38 on the shank portion 218 of the frame 202 as illustrated here positions the ball-end coupler 38 approximately equidistant between the spaced-apart control arms 320 and 322 of the control yoke 318.

Here, the C-clamp device 200 is shown more clearly having the arms 204, 206 of the C-shaped frame 202 on opposite sides of the control column 316 with the substantially cylindrical mounting surface thereof being clamped between the second arched movable clamping jaw 238 and the stationary clamping anvil 258 configured as the arched permanent stationary clamping anvil 260. The C-shaped frame 202 of the C-clamp device 200 is shown having the extruded arched V-shaped or U-shaped forward clamping surface 242 of the second movable clamping jaw 238 being secured against the substantially cylindrical mounting surface of the control column 316. The arched permanent stationary clamping anvil 260 of the second arm 206 is seated against one side of the substantially cylindrical control column 316, while the extruded arch forward clamping surface 242 of the second arched movable clamping jaw 238 is seated against the opposite cylindrical mounting surface to secure the convertible C-clamp device 200 in the selected position relative to the control yoke 318. As illustrated here, the combined rotatable and swivelable relationship of the second arched movable clamping jaw 238 with the swivel head 248 of the clamping rod 224 ensures the extruded arch forward clamping surface 242 is permitted to self-align with and seat against the substantially curved or cylindrical mounting surface of the control column 316.

Figure 27:
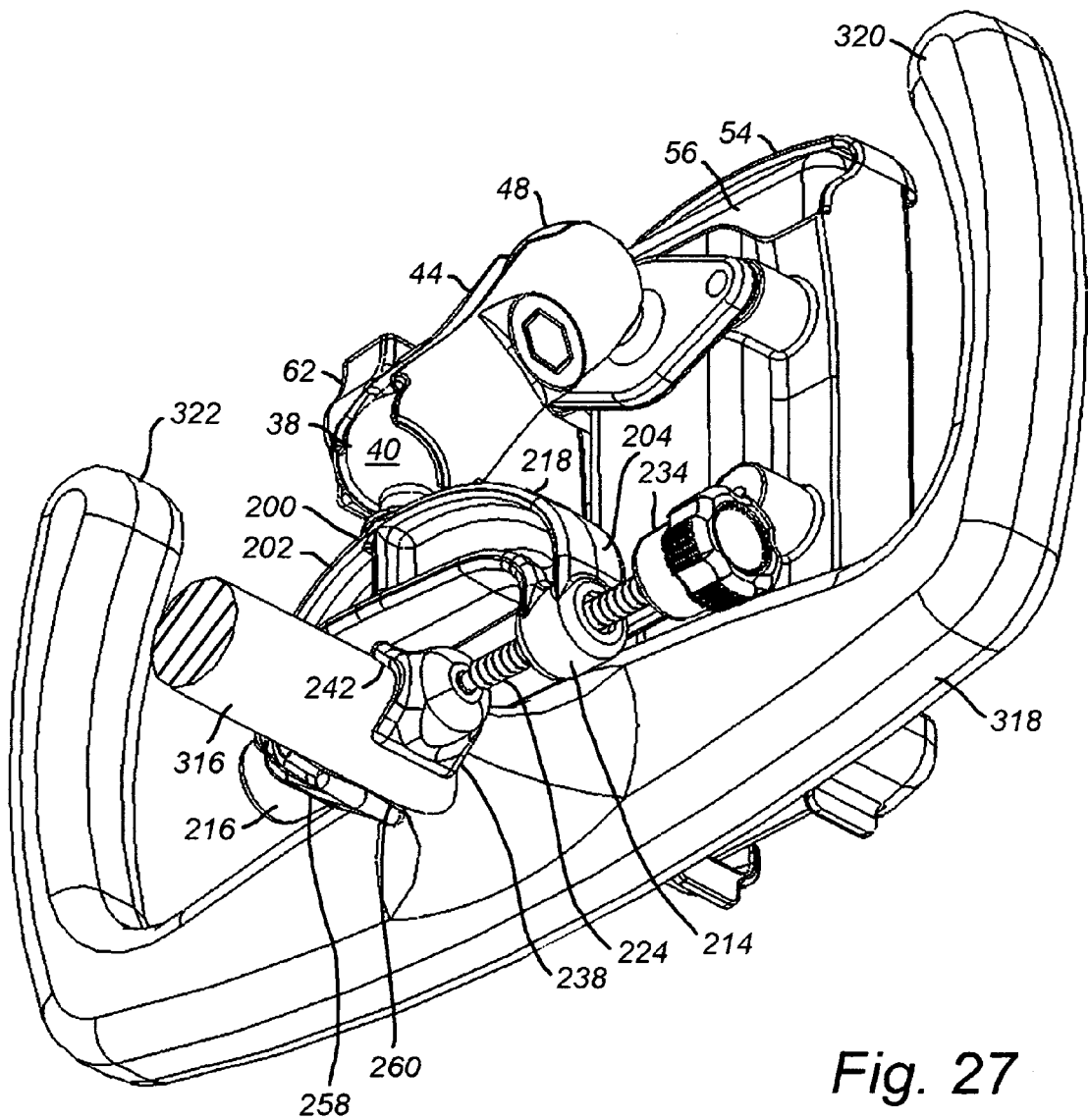
FIG. 27 is an upwardly looking bottom perspective view of the novel convertible C-clamp device as seen from the shadowed area under the overhanging edge protrusion of the cockpit dashboard.

FIG. 27 is a bottom perspective view looking up at the alternative convertible C-clamp device 200 from the shadowed area 34 under the overhanging edge protrusion 26 of the cockpit dashboard 28. Here, the C-clamp device 200 is more clearly shown having the extruded arch forward clamping surface 242 of the second arched movable clamping jaw 238 being secured against the substantially cylindrical mounting surface of the control column 316. The arched permanent stationary clamping anvil 260 of the second arm 206 is seated against one side of the substantially cylindrical control column 316, while the extruded arch forward clamping surface 242 of the second arched movable clamping jaw 238 is seated against the opposite cylindrical mounting surface to secure the convertible C-clamp device 200 in the selected position relative to the control yoke 318.

Alternatively, the alternative convertible C-clamp device 200 is optionally used to clamp onto a target mount having a combination of a substantially rectilinear surface and a substantially opposing curved or part-cylindrical surface spaced apart therefrom. Accordingly, the alternative convertible C-clamp device 200 is configured having the reconfigurable stationary clamping anvil 258 configured with the planar stationary clamping anvil 262 fitted in the extruded substantially V-shaped clamping surface 264 of the arched permanent stationary clamping anvil 260, as disclosed herein, and the second arched movable clamping jaw 238 provided on the moveable clamping rod 224, as also disclosed herein.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A clamp device, comprising:
    a C-shaped frame comprising first and second substantially opposing interconnected arms;
    a clamping rod carried by the first arm for longitudinal movement in a first clamping direction toward an internal face of the second arm and in a second opposite direction away from the second arm;
    different first and second movable clamping jaws removably coupleable to a portion of the clamping rod between the arms of the frame; and
    different first and second stationary clamping anvils being disposable on the internal face of the second arm, wherein the internal face of the second arm further comprises the first stationary clamping anvil being formed continuously therewith, the first stationary clamping anvil further comprising a concavely arched clamping anvil, and
    the second stationary clamping anvil further comprises a complementary base shaped to be received into the arched clamping anvil; and
    a removable fastener releasably coupleable between the second arm and the second stationary clamping anvil.

2. The clamp device of claim 1 wherein the wherein the first movable clamping jaw further comprises an arched clamping jaw, and the second movable clamping jaw further comprises a substantially planar clamping jaw.

3. The clamp device of claim 2 wherein the arched clamping jaw further comprises an extruded arch comprising a concave shape oriented toward the first arm and nominally transversely of the clamping rod.

4. The clamp device of claim 1 further comprising a part-spherical coupler projected from an external portion of the frame.

5. The clamp device of claim 1 wherein the different first and second stationary clamping anvils are further disposable in substantially alignment with the longitudinal movement of the clamping rod.

6. A clamp device, comprising:
   a substantially rigid C-shaped frame comprising first and second substantially opposing interconnected arms forming a throat between respective free ends thereof;
   a threaded clamping rod carried in a threaded bore through the free end of the first arm for longitudinal movement in a first clamping direction toward the free end of the second arm and in a second opposite direction away from the second arm;
   a drive head coupled adjacent to a first end of the clamping rod positioned external of the frame;
   a movable clamping jaw reconfigurable between an arched movable clamping jaw that is removably coupleable adjacent to a second end of the clamping rod between the arms of the frame, and a substantially planar movable clamping jaw that is alternatively removably coupleable adjacent to the second end of the clamping rod, wherein the arched movable clamping jaw further comprises a concavely arched shape formed on forward face thereof, and the substantially planar movable clamping jaw further comprises one or more substantially coplanar forward clamping surfaces formed on forward face thereof;
   a disengageable rotatable coupling between the threaded clamping rod and each of the arched and planar movable clamping jaws;
   a stationary clamping anvil formed on the internal face of the second arm, the stationary clamping anvil being reconfigurable between an arched stationary clamping anvil and a substantially planar stationary clamping anvil; and
   a part-spherical coupler projected from an external portion of the frame; and
   wherein the disengageable rotatable coupling between the threaded clamping rod and each of the arched and planar movable clamping jaws further comprises: a convexly rounded swivel head formed on the threaded clamping rod,
   a first complementary mating socket formed in the arched movable clamping jaw with an opening thereinto opposite from the concavely arched shape formed on the forward face thereof, and
   a second complementary mating socket formed in the substantially planar movable clamping jaw with an opening thereinto opposite from the one or more substantially coplanar forward clamping surfaces formed on the forward face thereof.

7. The clamp device of claim 6 wherein the stationary clamping anvil further comprises the arched stationary clamping anvil having a concavely arched shape formed on the internal face of the second arm.

8. The clamp device of claim 7 wherein the substantially planar stationary clamping anvil further comprises a discrete member comprising one or more substantially coplanar clamping surfaces and a base opposite therefrom and comprising a convexly arched shape complementary of the concavely arched shape of the arched stationary clamping anvil and removably insertable therein.

9. A clamp device, comprising:
   (a) a generally C-shaped frame having first and second substantially opposing arm portions each further comprising a free end, wherein:
      (i) the free end of the first arm portion further comprises a threaded bore, and
      (ii) the free end of the second arm portion further comprises a first permanent stationary clamping anvil continuous therewith and comprising a concavely arched clamping surface facing substantially toward the free end of the first arm portion, and a bore positioned substantially central thereof and substantially aligned with the threaded bore of the free end of the first arm portion;
   (b) a threaded rod comprising a first outboard end and a second inboard end with an external thread therebetween that is complementary of the threaded bore of the free end of the first arm portion of the frame, the threaded rod being receivable within the threaded bore of the frame for movement of the second inboard end between a first retracted position relative to a free end of the second arm, and a second extended position relative thereto, the second inboard end of the threaded rod further comprising a convex swivel head;
   (c) a control member coupled to the first outboard end of the threaded rod for controlling movement of the threaded rod between the first retracted position and the second extended position;
   (d) a first planar movable clamping jaw comprising a substantially planar forward clamping surface and an aperture rearward thereof communicating with a complementary concave socket formed therein, the aperture being sized to releasably receive the convex swivel head of the threaded rod therethrough into the complementary concave socket, and the complementary concave socket being formed to freely rotate and swivel about the swivel head;
   (e) a second arched movable clamping jaw that is interchangeable with the first planar movable clamping jaw on the convex swivel head of the threaded rod, the second arched movable clamping jaw further comprising an arched forward clamping surface and an aperture rearward thereof communicating with a complementary concave socket formed therein, the aperture being sized to releasably receive the convex swivel head of the threaded rod therethrough into the complementary concave socket, and the complementary concave socket being formed to freely rotate and swivel about the convex swivel head;
   (f) a second removable stationary clamping anvil comprising a substantially planar clamping surface opposite from a convexly arched base that is complementary to the concavely arched clamping surface of the first permanent stationary clamping anvil, the second removable stationary clamping anvil further comprising a clearance bore positioned substantially central of the clamping surface and formed with a seat recessed relative to the clamping surface;
   (g) a removable fastener comprising a threaded shank portion sized to pass through the clearance bore of the second removable stationary clamping anvil, and a head portion that is enlarged relative to thereto; and
   (h) a complementary threaded retainer substantially aligned with the threaded bore of the free end of the first arm portion of the frame, the complementary threaded retainer being threaded to mate with threads formed on the threaded shank portion of the fastener.

10. The clamp device of claim 9, further comprising a part-spherical coupler projected from an external portion of the frame.

11. The clamp device of claim 10 wherein the concavely arched clamping surface of the first permanent stationary clamping anvil further comprises an inside wall surface extended substantially transversely of the threaded bore portion of the free end of the first arm portion of the frame; and the complementary convexly arched base of the second removable stationary clamping anvil further comprises an outside wall surface extended substantially transversely of the substantially planar clamping surface opposite therefrom.

12. The clamp device of claim 11 wherein the arched forward clamping surface of the second arched movable clamping jaw further comprises an inside wall surface extended substantially transversely of the aperture thereof communicating with the complementary concave socket formed therein.

13. The clamp device of claim 12 wherein the bore in the free end of the second arm portion further comprises a substantially smooth clearance bore extended substantially therethrough, and a recessed nut pocket positioned opposite of the concavely arched clamping surface and substantially aligned with the clearance bore; and the complementary threaded retainer further comprises a nut threaded to mate with threads formed on the threaded shank portion of the fastener and sized to be at least partially received into the recessed nut pocket.

* * * * *